United States Patent
Sakakibara

(10) Patent No.: US 11,811,333 B2
(45) Date of Patent: Nov. 7, 2023

(54) POWER CONVERSION DEVICE

(71) Applicant: DAIKIN INDUSTRIES, LTD., Osaka (JP)

(72) Inventor: Kenichi Sakakibara, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 18/128,052

(22) Filed: Mar. 29, 2023

(65) Prior Publication Data
US 2023/0238898 A1 Jul. 27, 2023

Related U.S. Application Data

(63) Continuation of application No. PCT/JP2021/033568, filed on Sep. 13, 2021.

(30) Foreign Application Priority Data

Sep. 30, 2020 (JP) ................................. 2020-165215

(51) Int. Cl.
*H02M 5/42* (2006.01)
*H02M 1/34* (2007.01)
(Continued)

(52) U.S. Cl.
CPC .......... *H02M 7/5395* (2013.01); *H02M 1/34* (2013.01); *H02M 1/344* (2021.05); *H02M 1/348* (2021.05);
(Continued)

(58) Field of Classification Search
CPC .......... H02M 5/40; H02M 5/42; H02M 5/453; H02M 5/458; H02M 5/4585; H02M 7/5395; H02M 1/34; H02M 7/12
See application file for complete search history.

(56) References Cited

U.S. PATENT DOCUMENTS 5,111,374 A * 5/1992 Lai ...................... H02M 7/4826
 318/811
2015/0049526 A1 2/2015 Kagimura et al.

FOREIGN PATENT DOCUMENTS

JP 5429316 B2 12/2013
WO WO-2020189317 A1 * 9/2020 ............ H02M 1/007

OTHER PUBLICATIONS

International Preliminary Report of corresponding PCT Application No. PCT/JP2021/033568 dated Apr. 13, 2023.
(Continued)

*Primary Examiner* — Gary L Laxton
(74) *Attorney, Agent, or Firm* — Global IP Counselors, LLP

(57) ABSTRACT

A power converter includes a converter circuit, an inverter circuit, a clamp circuit, a scrubber circuit, and an element including a resistive component. The converter circuit generates from an AC voltage source a DC voltage with AC components superimposed. The inverter circuit has an input connected with an output of the converter circuit. The inverter circuit is configured to convert the DC voltage into an AC voltage by switching, and output the AC voltage to an inductive load. The clamp circuit includes a first capacitor and a first diode connected in series. The clamp circuit is connected between a positive output and a negative output of the converter circuit. The snubber circuit includes a second capacitor and a second diode connected in series. The snubber circuit is connected between the positive output and the negative output of the converter circuit.

13 Claims, 19 Drawing Sheets

(51) Int. Cl.
*H02M 7/5395* (2006.01)
*H02M 7/12* (2006.01)
*H02M 5/458* (2006.01)
*H02M 5/453* (2006.01)

(52) U.S. Cl.
CPC ............... *H02M 5/42* (2013.01); *H02M 7/12* (2013.01); *H02M 5/453* (2013.01); *H02M 5/458* (2013.01)

(56) References Cited

OTHER PUBLICATIONS

International Search Report of corresponding PCT Application No. PCT/JP2021/033568 dated Nov. 9, 2021.

* cited by examiner

POWER CONVERSION DEVICE

CROSS-REFERENCE TO RELATED APPLICATIONS

This is a continuation of International Application No. PCT/JP2021/033568 filed on Sep. 13, 2021, which claims priority to Japanese Patent Application No. 2020-165215, filed on Sep. 30, 2020. The entire disclosures of these applications are incorporated by reference herein.

BACKGROUND

Technical Field

The present disclosure relates to a power converter.

Background Art

Some power converters use a direct-type power converter with a high-frequency link. As an overvoltage protection circuit of a direct-type power converter, a so-called RCD snubber circuit with a circuit configuration including a capacitor and a resistor connected in parallel with each other would be employed in some cases (for example, see Japanese Patent No. 5429316). The reason why such a circuit configuration is used is that, for example, when a high-frequency link is employed, surge power absorbed by a capacitor is discharged via a resistor parallel to the capacitor.

SUMMARY

A first aspect of the present disclosure is directed to a power converter. The power converter includes a converter circuit, an inverter circuit, a clamp circuit, a scrubber circuit, and an element including a resistive component. The converter circuit generates from an AC voltage source a DC voltage with AC components superimposed. The inverter circuit has an input connected with an output of the converter circuit. The inverter circuit is configured to convert the DC voltage into an AC voltage by switching, and output the AC voltage to an inductive load. The clamp circuit includes a first capacitor and a first diode connected in series. The clamp circuit is connected between a positive output and a negative output of the converter circuit. The snubber circuit includes a second capacitor and a second diode connected in series. The snubber circuit is connected between the positive output and the negative output of the converter circuit. The outputs of the converter circuit, the clamp circuit, the snubber circuit, and the input of the inverter circuit are arranged in order. The first and second diodes are connected on the positive side or the negative side with respect to the first and second capacitors. The element is configured such that the element connects between a terminal of the first capacitor, with which terminal the first diode is connected, and a terminal of the second capacitor, with which terminal the second diode is connected. Impedances from the positive output to the negative output are such that an impedance across the clamp circuit is lower than an impedance across the snubber circuit. If the first and second diodes are connected on the positive side with respect to the first and second capacitors, impedances from a cathode of the second diode to the negative output are such that the impedance across the clamp circuit is higher than the impedance across the snubber circuit. If the first and second diodes are connected on the negative side with respect to the first and second capacitors, impedances from an anode of the second diode to the positive output are such that the impedance across the clamp circuit is higher than the impedance across the snubber circuit.

DETAILED DESCRIPTION OF EMBODIMENT(S)

First Embodiment

Figure 1:
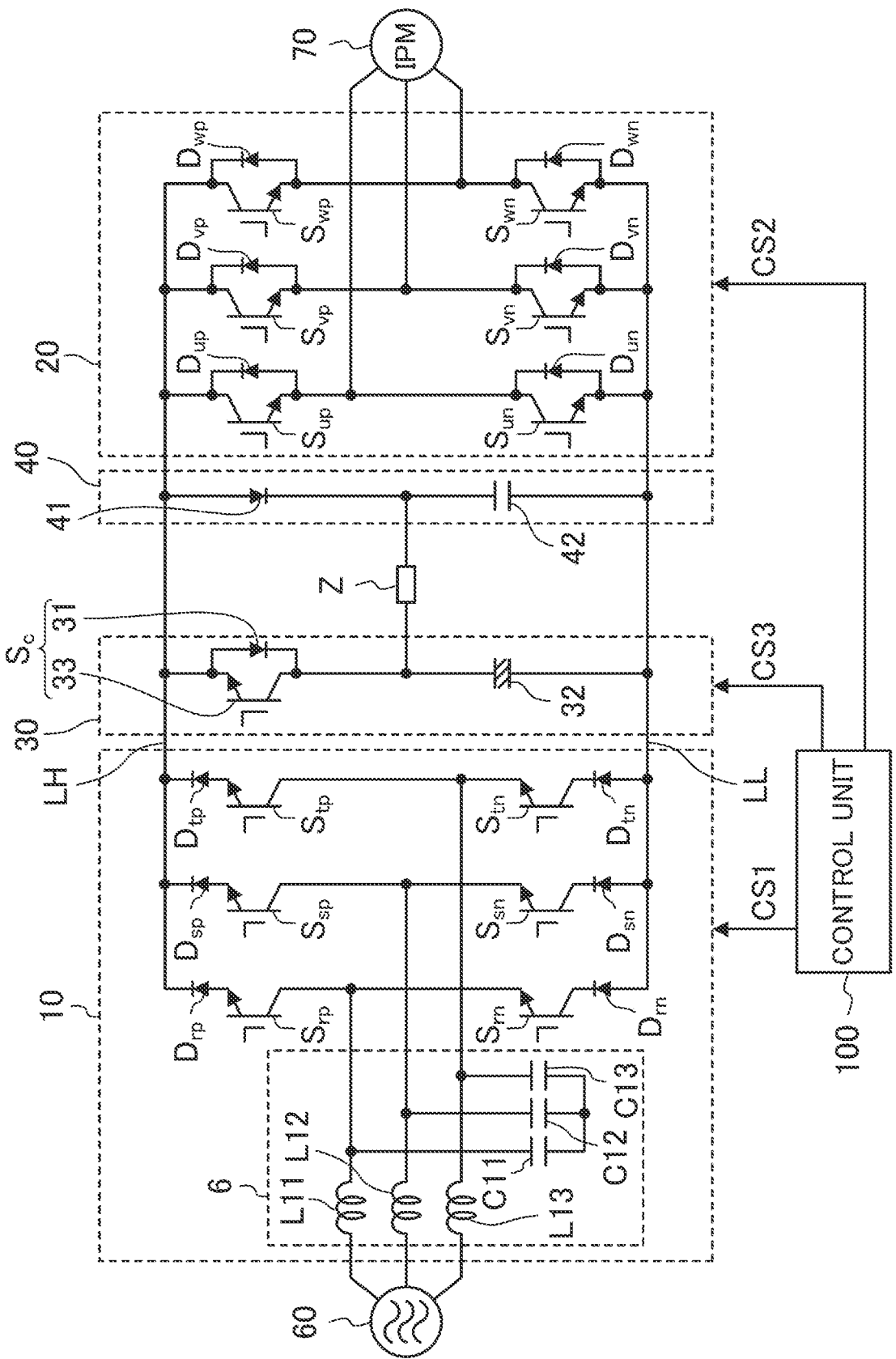
FIG. 1 is a block diagram illustrating a configuration of a power converter according to a first embodiment.

FIG. 1 is a block diagram illustrating a configuration of a power converter (1) according to a first embodiment. The power converter (1) includes a converter circuit (10), an inverter circuit (20), a clamp circuit (30), a snubber circuit (40), an element (Z), and a control unit (100). The power converter (1) converts a voltage (hereinafter referred to as power supply voltage (yin)) supplied from an AC voltage source (60) to a predetermined AC voltage. The AC voltage source (60) is a three-phase AC voltage source. The power converter (1) supplies, to a motor (70) (load), the AC voltage obtained through the conversion.

The motor (70) is an inductive load. In this example, the motor (70) is illustrated in the drawing as a so-called interior permanent magnet (IPM) motor.

The converter circuit (10) is configured to generate, from an AC voltage source (60), a DC voltage with AC components superimposed. The converter circuit (10) includes a filter circuit (6), six transistors (Srp, Ssp, Stp, Sm, Ssn, Stn) (switching elements), and six diodes (Drp, Dsp, Dtp, Drn, Dsn, Dtn). The six transistors (Srp, Ssp, Stp, Sm, Ssn, Stn) are controlled to turn ON and OFF according to a control signal (CS1) supplied from the control unit (100). How the control unit (100) controls the converter circuit (10) will be described later.

The converter circuit (10) includes three switching legs. Each switching leg is such that series circuits of a transistor and a diode are connected with each other in series by connecting their transistors together, thereby forming one switching leg.

More specifically, a series circuit of the transistor (Srp) and the diode (Drp) and a series circuit of the transistor (Sm) and the diode (Drn) form a switching leg for controlling positive and negative phase currents. In this switching leg, a collector of the transistor (Srp) and an emitter of the transistor (Sm) are connected together.

Similarly, a series circuit of the transistor (Ssp) and the diode (Dsp) and a series circuit of the transistor (Ssn) and the diode (Dsn) are connected in series, thereby forming one switching leg. In this switching leg, a collector of the transistor (Ssp) and an emitter of the transistor (Ssn) are connected together.

Furthermore, a series circuit of the transistor (Stp) and the diode (Dtp) and a series circuit of the transistor (Stn) and the diode (Dtn) are connected in series, thereby forming one switching leg. In this switching leg, a collector of the transistor (Stp) and an emitter of the transistor (Stn) are connected together.

The emitters of the transistors (Srp, Ssp, Stp) are connected with the anodes of the diodes (Drp, Dsp, Dtp), respectively. The cathodes of the diodes (Drp, Dsp, Dtp) are connected with each other, thereby constituting a positive output of the converter circuit (10). The collectors of the transistors (Sm, Ssn, Stn) are connected with the cathodes of the diodes (Drn, Dsn, Dtn), respectively. The anodes of the diodes (Drn, Dsn, Dtn) are connected with each other, thereby constituting a negative output of the converter circuit (10).

In the following, the transistors (Srp, Ssp, Stp) may be referred to as upper-arm transistors and the transistors (Sm, Ssn, Stn) as lower-arm transistors. A power supply line connected with the positive-side output of the converter circuit (10) may be referred to as a positive power supply line (LH). A power supply line connected with the negative-side output of the converter circuit (10) may be referred to as a negative power supply line (LL).

The filter circuit (6) includes three coils (L11, L12, L13) and three capacitors (C11, C12, C13).

One end of the coil (L11) is connected with the collector of the transistor (Srp) and the emitter of the transistor (Sm). The other end of the coil (L11) is connected with an output of the AC voltage source (60). The output is for outputting a phase voltage (vr). The phase voltage (vr) of the AC voltage source (60) is applied, via the coil (L11), to the collector of the transistor (Srp) and the emitter of the transistor (Sm).

One end of the coil (L12) is connected with the collector of the transistor (Ssp) and the emitter of the transistor (Ssn). The other end of the coil (L12) is connected with an output of the AC voltage source (60). The output is for outputting a phase voltage (vs). The phase voltage (vs) of the AC voltage source (60) is applied, via the coil (L12), to the collector of the transistor (Ssp) and the emitter of the transistor (Ssn).

One end of the coil (L13) is connected with the collector of the transistor (Stp) and the emitter of the transistor (Stn). The other end of the coil (L13) is connected with an output of the AC voltage source (60). The output is for outputting a phase voltage (vt). The phase voltage (vt) of the AC voltage source (60) is applied, via the coil (L13), to the collector of the transistor (Stp) and the emitter of the transistor (Stn).

One end of the capacitor (C11) is connected between the coil (L11) and the collector of the transistor (Srp). One end of the capacitor (C12) is connected between the coil (L12) and the collector of the transistor (Ssp). One end of the capacitor (C13) is connected between the coil (L13) and the collector of the transistor (Stp). The other ends of the capacitors (C11, C12, C13) are connected with each other.

The inverter circuit (20) includes six transistors (Sup, Svp, Swp, Sun, Svn, Swn) (switching elements), and six diodes (Dup, Dvp, Dwp, Dun, Dvn, Dwn). The transistors (Sup, Svp, Swp, Sun, Svn, Swn) are connected in a bridge configuration.

The inverter circuit (20) includes three switching legs. Each switching leg is constituted by connecting two transistors in series.

More specifically, the emitter of the transistor (Sup) and the collector of the transistor (Sun) are connected, thereby forming one switching leg. The emitter of the transistor (Svp) and the collector of the transistor (Svn) are connected, thereby forming one switching leg. The emitter of the transistor (Srp) and the collector of the transistor (Sm) are connected, thereby forming one switching leg.

Each of the three switching legs is such that respective connection points between the upper-arm transistors (Sup, Svp, Swp) and the lower-arm transistors (Sun, Svn, Swn) are connected with coils (not illustrated) of the respective phases (u phase, v phase, w phase) of the motor (70), respectively. Each transistor (Sup, Svp, Swp, Sun, Svn, Swn) of the inverter circuit (20) is connected in antiparallel with corresponding one of the diodes (Dup, Dvp, Dwp, Dun, Dvn, Dwn).

The collector of each of the upper-arm transistors (Sup, Svp, Swp) is connected with the positive output of the converter circuit (10) via the positive power supply line (LH). The emitter of each of the lower-arm transistors (Sun, Svn, Swn) is connected with the negative output of the converter circuit (10) via the negative power supply line (LL).

The six transistors (Sup, Svp, Swp, Sun, Svn, Swn) of the inverter circuit (20) are controlled to turn ON and OFF according to a control signal (CS2) supplied from the control unit (100). The control unit (100) controls the turning ON and OFF to cause the inverter circuit (20) to perform so-called PWM modulation. The control will be described later.

The clamp circuit (30) includes a first diode (31), a first capacitor (32), and a transistor (33). The clamp circuit (30) has specifications such as the capacitance and withstand voltage of the first capacitor (32), so that the power regenerated from the inverter circuit (20) (motor (70)) can be absorbed.

The clamp circuit (30) is connected between the positive output and the negative output of the converter circuit (10). The clamp circuit (30) is configured such that the anode of the first diode (31) is connected with the positive output of the converter circuit (10) (more specifically, with the positive power supply line (LH)). The cathode of the first diode (31) is connected with one end of the first capacitor (32).

The other end of the first capacitor (32) (which is the end thereof not connected with the first diode (31)) is connected with the negative output of the converter circuit (10) (more specifically, with the negative power supply line (LL)).

The transistor (33) (switching element) is connected in parallel with the first diode (31). More specifically, the collector of the transistor (33) is connected with the cathode of the first diode (31). The emitter of the transistor (33) is connected with the anode of the first diode (31).

The transistor (33) and the first diode (31) forms a switching section (Sc). The ON/OFF of the transistor (33) is controlled according to a control signal (CS3) supplied from the control unit (100). The control of the transistor (33) will be described later.

The snubber circuit (40) includes a second diode (41) and a second capacitor (42). The second diode (41) and the second capacitor (42) are connected in series with each other. More specifically, the cathode of the second diode (41) is connected with one end of the second capacitor (42).

The snubber circuit (40) is connected between the positive output and the negative output of the converter circuit (10). More specifically, the anode of the second diode (41) is connected with the positive output of the converter circuit (10)) (i.e., with the positive power supply line (LH)). The other end of the second capacitor (42) (which is the end thereof not connected with the second diode (41)) is connected with the negative output of the converter circuit (10) (i.e., with the negative power supply line (LL)).

The power converter (1) is so configured that the outputs of the converter circuit (10), the clamp circuit (30), the snubber circuit (40), and the input of the inverter circuit (20) are connected in this order.

An element (Z) is an element with a resistive component. Via the element (Z), the end of the first capacitor (32) at which the first capacitor (32) is connected with the first diode (31) is connected with the end of the second capacitor (42) at which the second capacitor (42) is connected with the second diode (41).

Figure 2:
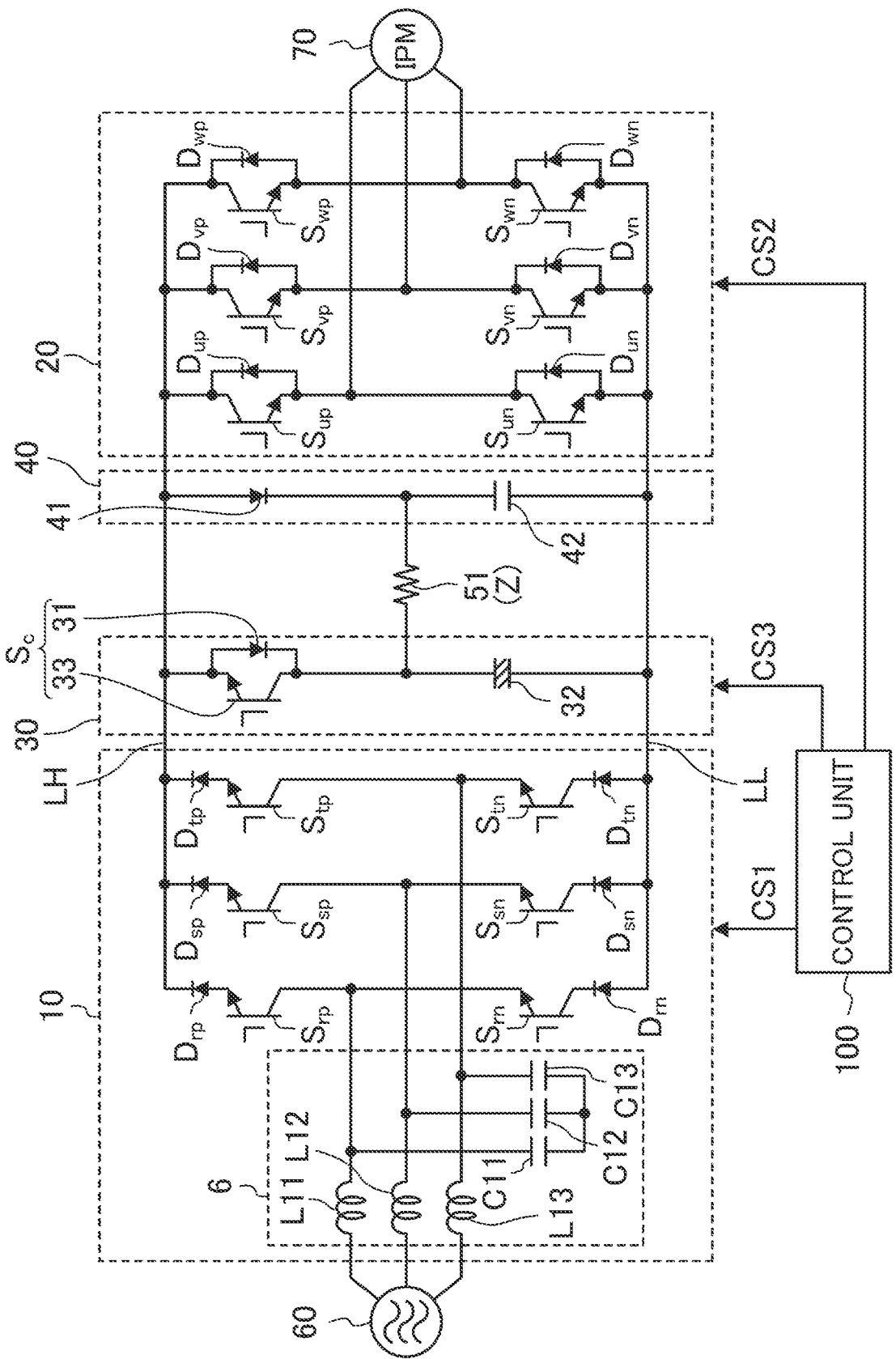
FIG. 2 is an example of an element with a resistive component.

The element (Z) may have various configurations. FIG. 2 illustrates one example of the element (Z) with a resistive component. As illustrated in FIG. 2, the element (Z) may be a resistor (51).

Figure 3:
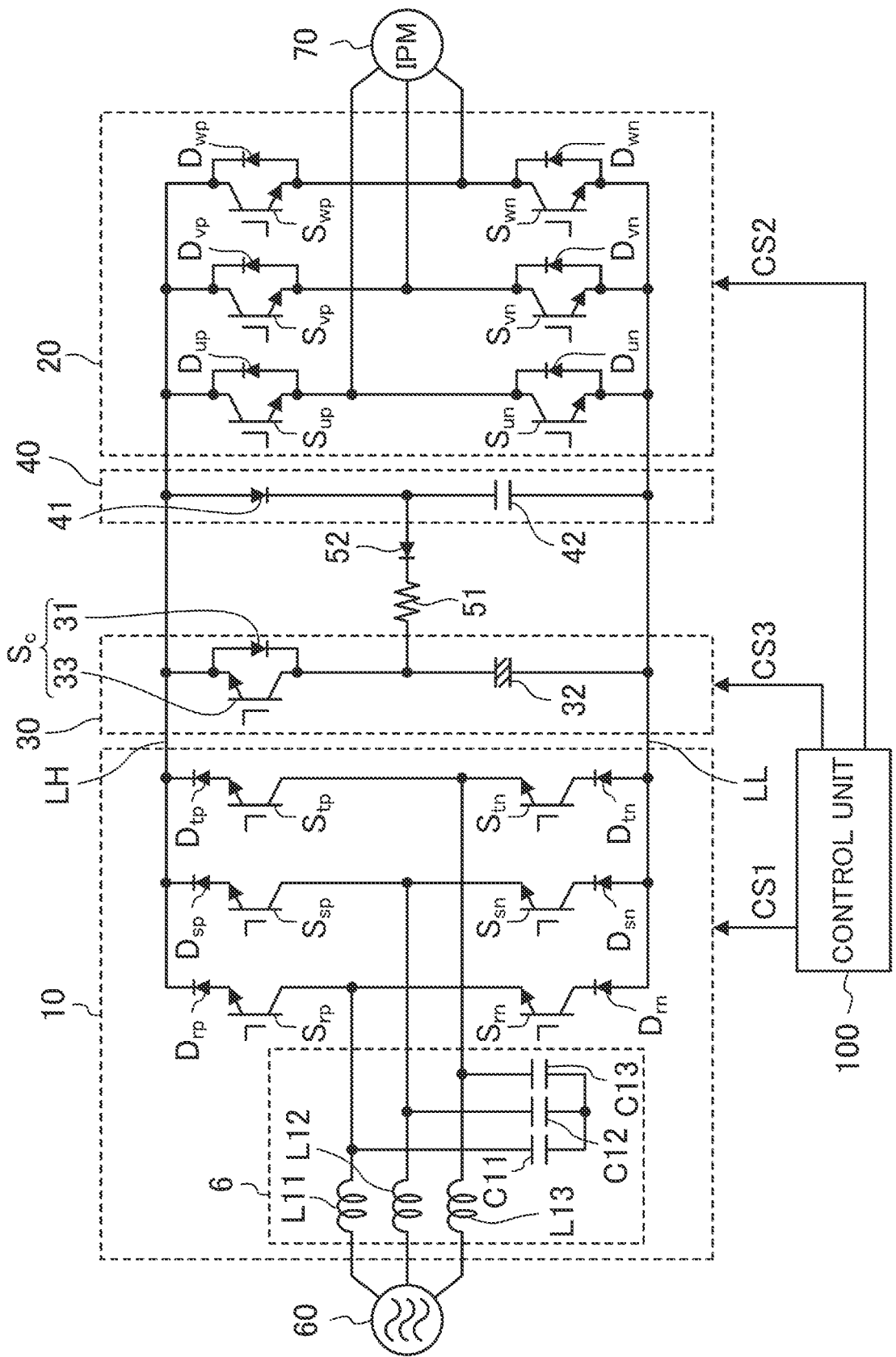
FIG. 3 is another example of an element with a resistive component.

FIG. 3 illustrates another example of the element (Z) with a resistive component. As illustrated in FIG. 3, the element (Z) may be a series circuit of a resistor (51) and a third diode (52). In the example illustrated in FIG. 3, the cathode of the third diode (52) is connected with one end of the resistor (51). The anode of the third diode (52) is connected with one end of the second capacitor (42) (at which the second capacitor (42) is connected with the second diode (41)). The other end of the resistor (51) is connected with one end of the first capacitor (32) (at which the first capacitor (32) is connected with the first diode (31)).

The element (Z) may be another element such as a positive temperature coefficient (PTC) thermostat.

In this embodiment, the impedances from the positive output (positive power supply line (LH)) to the negative output (negative power supply line (LL)) are such that the impedance across the clamp circuit (30) is lower than the impedance across the snubber circuit (40).

In this embodiment, the first and second diodes (31, 41) are connected on the positive side with respect to the first and second capacitors (32, 42). In this case, the power converter (1) includes the element (Z) in such a way that the impedances from the cathode of the second diode (41) to the negative output are such that the impedance across the clamp circuit (30) is higher than the impedance across the snubber circuit (40).

The control unit (100) includes a CPU and a memory device (which are not illustrated). The memory device stores therein programs for operating the CPU, and the like. The control unit 100 is configured such that the CPU operates to output control signals (CS1, CS2, SC3). According to the control signals (CS1, CS2, SC3), operations of the converter circuit (10), the clamp circuit (30), and the inverter circuit (20) are controlled.

The impedances in the above description are defined as follows.

Among the impedances from the positive output to the negative output, the impedance across the clamp circuit (30) and the impedance across the snubber circuit (40) are impedances at either one of the following frequencies (resonance frequencies).

(1) Resonance frequency between the load inductance of the inverter circuit (20) and the first capacitor (32)

(2) Resonance frequency between the first capacitor (32) and the inductance from the AC voltage source (60) to the clamp circuit (30)

For example, assuming that, if Z=4.4Ω, the load inductance of the inverter circuit (20) and the inductance from the AC voltage source to the clamp circuit (30) are 3 mH, and the electrostatic capacitance of the first capacitor (32) is 760 µF, the resonance frequency is 105 Hz.

In the following, the impedances from the positive output and the negative output are compared as to the clamp circuit (30) and the snubber circuit (40). Assuming that the electrostatic capacitance of the second capacitor (42) is 0.068 µF, and the impedance of the first capacitor (32) is 1.99Ω, the sum of this impedance and the impedance of the element (Z) is merely 4.83Ω. These values are extremely small with respect to the 222 kΩ of the second capacitor (42). Therefore, the inductive energy of the motor is absorbed by the clamp circuit (30).

In this disclosure, the impedances in each of the following cases (A) and (B) are also defined.

(A) If the first and second diodes (31, 41) are connected on the positive side with respect to the first and second capacitors (32, 42), the impedances in question are the impedance across the snubber circuit (40) and the impedance across the clamp circuit (30) among the impedances from the cathode of the second diode (41) to the negative output.

(B) If the first and second diodes (31, 41) are connected on the negative side with respect to the first and second capacitors (32, 42) (which is the case of a second embodiment described later), the impedances in question are the impedance across the snubber circuit (40) and the impedance across the clamp circuit (30) among the impedances from the anode of the second diode (41) to the positive output.

In the present disclosure, the impedances in each of the above cases (A) and (B) are impedances at either one of the following frequencies (resonance frequencies) below.

(1) Resonance frequency between the second capacitor (42) and the inductance from the converter circuit (10) to the snubber circuit (40)

(2) Resonance frequency between the second capacitor (42) and the inductance from the snubber circuit (40) to the inverter circuit (20)

For example, assuming that, if Z=4.4Ω, the electrostatic capacitance of the second capacitor (42) is 0.068 μF, and the stray inductance of the line on the positive side between the clamp circuit (30) and the snubber circuit (40) is 100 nH, the resonance frequency is 6.1 MHz.

In the following, assuming that the electrostatic capacitance of the first capacitor (32) is 760 μF, the impedances from the cathode of the second diode (41) to the negative output is compared with the impedance of the anode of the second diode (41) to the positive output. Since the impedance of the first capacitor (32) alone is extremely small, the impedance across the clamp circuit (30) to which the element (Z) is connected in series is 4.4Ω. This value is substantially equal to the impedance of 3.83Ω across the second capacitor (42). This reduces a surge current by half, which is then diverted to the snubber circuit (40) before sent to the clamp circuit (30). If the element (Z) has an impedance larger than that, the current sent to the clamp circuit (30) can be further reduced.

Operation Example (Example of Control)

Example of Controls of the Converter Circuit (10) and the Inverter Circuit (20)

The converter circuit (10) converts, into DC voltages, the three-phase (r phase, s phase, t phase) AC voltages (phase voltages (vr, vs, vt) from the AC voltage source (60). The DC voltages are superimposed with an AC component.

Figure 4:
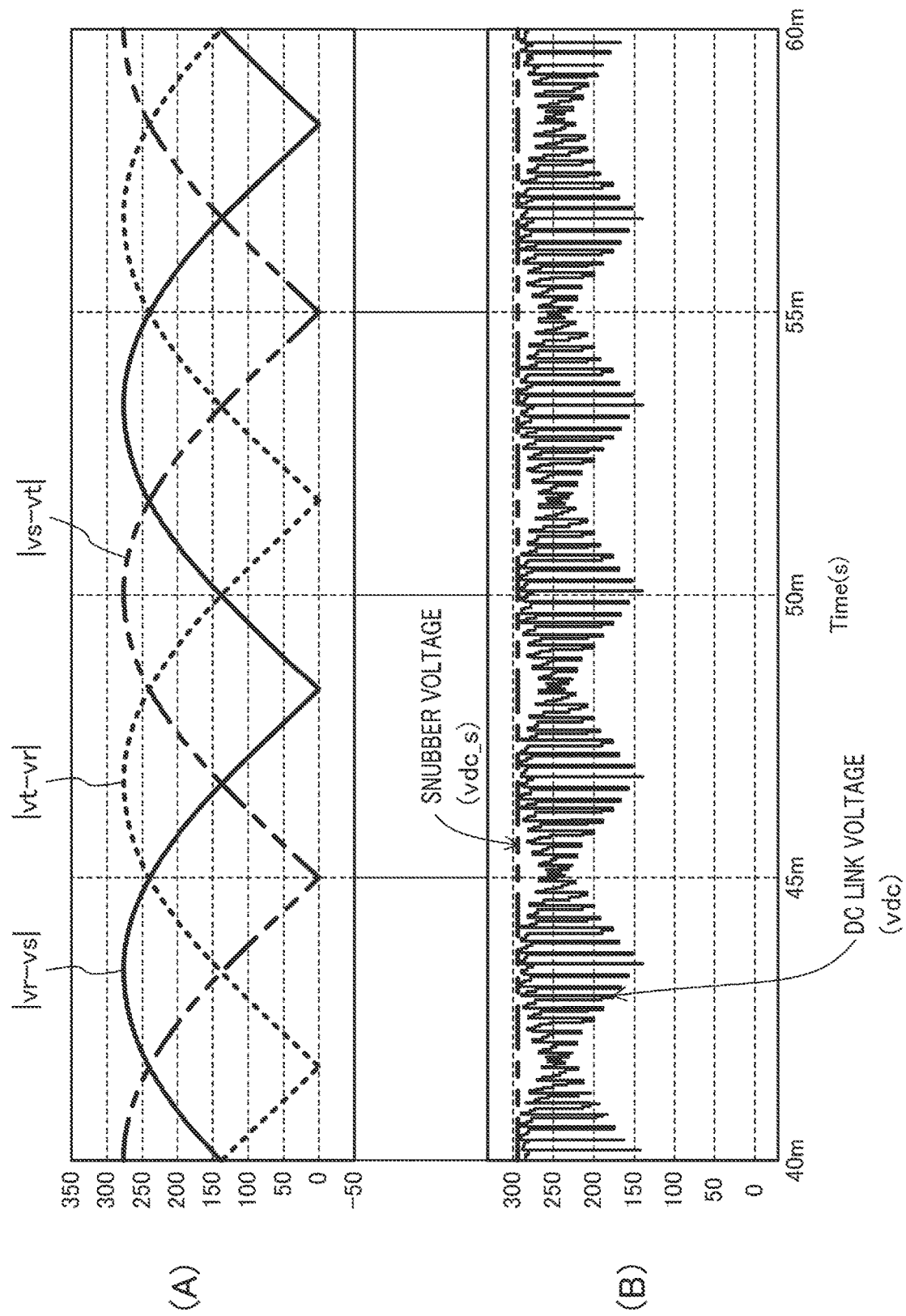
FIG. 4 is a diagram showing exemplary waveforms of absolute values of line voltages in an AC voltage source, and the other waveforms.

FIG. 4 is a diagram showing exemplary waveforms of absolute values of line voltages in the AC voltage source (60), and the other waveforms. In FIG. 4, (A) illustrates the exemplary waveform of absolute values of line voltages of the AC voltage source (60). In FIG. 4, (B) illustrates an exemplary waveform of a voltage supplied to the inverter circuit (20) (hereinafter, the voltage is referred to as a DC link voltage (vdc)), and the snubber voltage (vdc_s).

The phase voltages of the three-phase alternating currents are in either one of two states: a state including two positive phases and one negative phase, or a state including two negative phases and one positive phase. The phase voltages of the three-phase alternating currents can be considered as six 60-degree-divided regions.

More specifically, the control unit (100) performs the following first and second controls. In the first and second controls, the control unit (100) outputs the control signal (CS1) to the inverter circuit (20) so as to control the turning ON and OFF of the transistors (Srp, Ssp, Stp, Sm, Ssn, Stn) of the converter circuit (10).

In the following, the description will be based on a region with the t phase being the lowest (which will be referred to as region 1) and a region with the t phase being the highest (which will be referred to as a region 2). In the first control, the control unit (100) causes the transistor (Stn) to flow the t phase with the lowest phase voltage in the region 1. Furthermore, in the first control, the control unit (100) switches over between the r and s phases with the highest or intermediate phase voltage at the following conduction ratios drt and dst by using the transistors (Srp, Ssp). The conduction ratios may be determined, referring to a known technique (such as the publication of Japanese Patent No. 4135026).

$$d_{rt} = \frac{\cos\theta_r}{|\cos\theta_t|},$$ Math 1

$$d_{st} = \frac{\cos\theta_s}{|\cos\theta_t|}$$

In the second control, the control unit (100) causes the transistor (Stp) to flow the t phase with the highest phase voltage in the region 2. Furthermore, in the second control, the control unit (100) switches over between the r and s phases with the intermediate or lowest phase voltage at the following conduction ratios drc and dsc by using the transistors (Sm, Ssn).

In this embodiment, the above-described control is performed for each of the six regions divided by 60 degrees. As a result, the converter circuit (10) supplies, as the DC link voltages (vdc), two voltages: a line voltage Emax (the highest voltage) between the highest phase and the lowest phase and a line voltage Emid (intermediate voltage) generated in the intermediate phase between the lowest phase (region 1) and the highest phase (region 2) (see (B) of FIG. 4).

The inverter circuit (20) performs the PWM modulation on the highest voltage and the intermediate voltage and outputs to the motor (70) an AC voltage thus modulated. Examples of methods of the PWM modulation include a method using a triangle-waveform carrier signal, a spatial vector modulation method using a voltage vector, and any suitable methods.

The PWM modulation performed by the inverter circuit (20) is controlled by the control unit (100). In the control, the control unit (100) outputs a control signal (CS2) for controlling ON/OFF to the control terminals of the transistors (Sup, Svp, Swp, Sun, Svn, Swn).

Operation Example of the Clamp Circuit (30) and Snubber Circuit (40)

Figure 5:
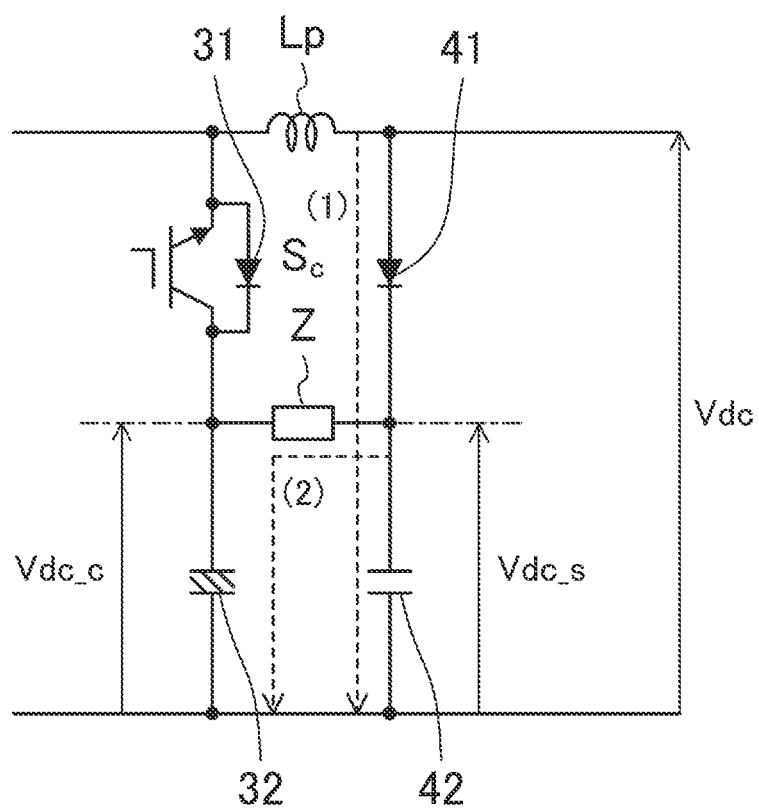
FIG. 5 is a diagram for explaining operations of a clamp circuit and a snubber circuit.

FIGS. 5 and 6 are diagrams for explaining the operations of the clamp circuit (30) and the snubber circuit (40).

FIG. 5 focuses the clamp circuit (30) and the snubber circuit (40). Here, it is assumed that the transistor (33) is turned OFF. A coil (Lp) in FIG. 5 schematically represents the stray inductance of the line on the positive side between the clamp circuit (30) and the snubber circuit (40). Thus, this illustration does not mean that the coil (Lp) as a component is present in the power converter (1). Here, it is assumed that the stray inductance is 100 nH.

FIGS. 6A to 6D illustrate examples of the voltages across the clamp circuit (30) and the snubber circuit (40), and the like. The horizontal axes of FIGS. 6A to 6D are time and mutually in the same time intervals.

Figure 6A:
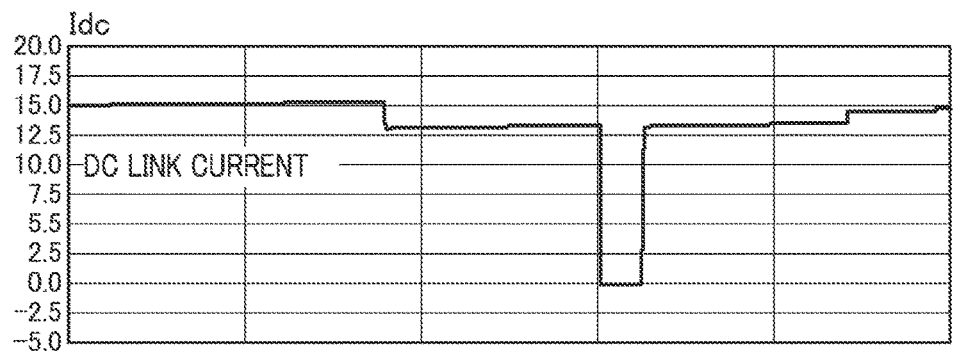
FIG. 6A, FIG. 6B, FIG. 6C and FIG. 6D are diagrams showing voltages and others of the clamp circuit and the snubber circuit.
Figure 6B:
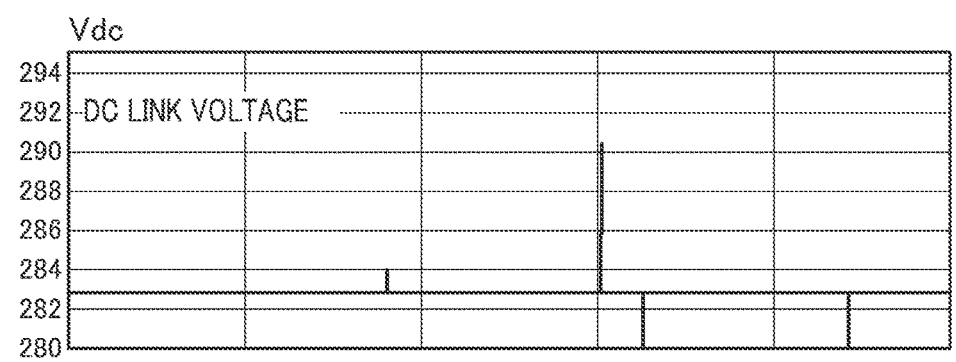

FIG. 6A illustrates the waveform of the DC link current (idc). The DC link current (idc) is a current from the converter circuit (10) to the inverter circuit (20). FIG. 6B illustrates the waveform of the DC link voltage (vdc).

Figure 6C:
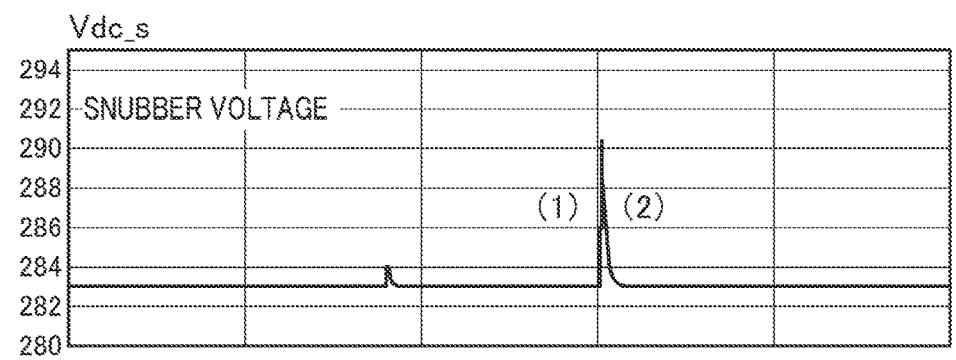
Figure 6D:
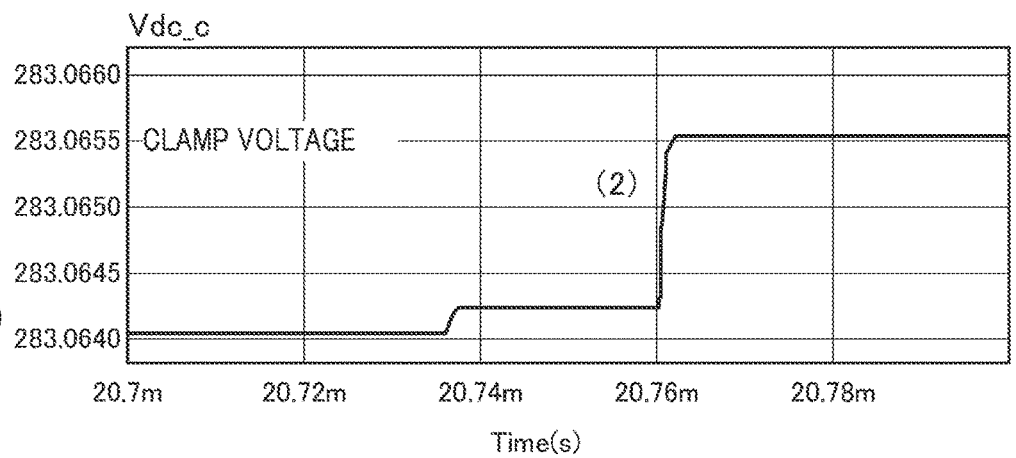

FIG. 6C illustrates the waveform of the snubber voltage (vdc_s). The snubber voltage (vdc_s) is a voltage between the terminals of the second capacitor (42) (see FIG. 5). FIG. 6D illustrates the waveform of the clamp voltage (vdc_c). The clamp voltage (vdc_c) is a voltage between the terminals of the first capacitor (32) (see FIG. 5).

In the power converter (1), if the DC link current (idc) is shut off, the energy accumulated in the stray inductance (Lp) of the line is released therefrom. Accordingly, the DC link voltage (vdc) increases (see FIGS. 6A and 6B).

When the stray inductance (Lp) releases energy therefrom, power is accumulated in the second capacitor (42) of the snubber circuit (40) via the second diode (41) (the path (1) in FIG. 5). Accordingly, the snubber voltage (vdc_s) increases (see (1) in FIG. 6C).

After that, the second capacitor (42) discharges the energy through the element (Z) to the first capacitor (32) of the clamp circuit (30). Accordingly, the snubber voltage (vdc_s) decreases (see (2) in FIG. 6C). The discharging of the second capacitor (42) causes charging of the first capacitor (32) via the element (Z). As a result, the clamp voltage (vdc_c) increases (see (2) in FIG. 6D), and the charging/discharging operations stop when the clamp voltage (vdc_c) and snubber voltage (vdc_s) become equal to each other.

In this embodiment, because the transistor (33) is turned OFF, the clamp voltage (vdc_c) and the snubber voltage (vdc_s) are greater than the peak value of the highest voltage at the DC link voltage (vdc). This occurs because, although the amount of the decrease of the snubber voltage (vdc_s) is largely different from the amount of the increase of the clamp voltage (vdc_c), the stray inductance of the snubber circuit (40) for absorbing the power is 100 nH, which is comparatively small with respect to the inductive load of mH order that the clamp circuit (30) has for absorbing the power, and consequently the capacitance ratio between the snubber capacitor (the second capacitor (42)) and the clamp capacitor (the first capacitor (32)) becomes as large as 1000 times. Therefore, the clamp voltage (vdc_c) is substantially constantly near the highest value of the DC link voltage (vdc).

Figure 7:
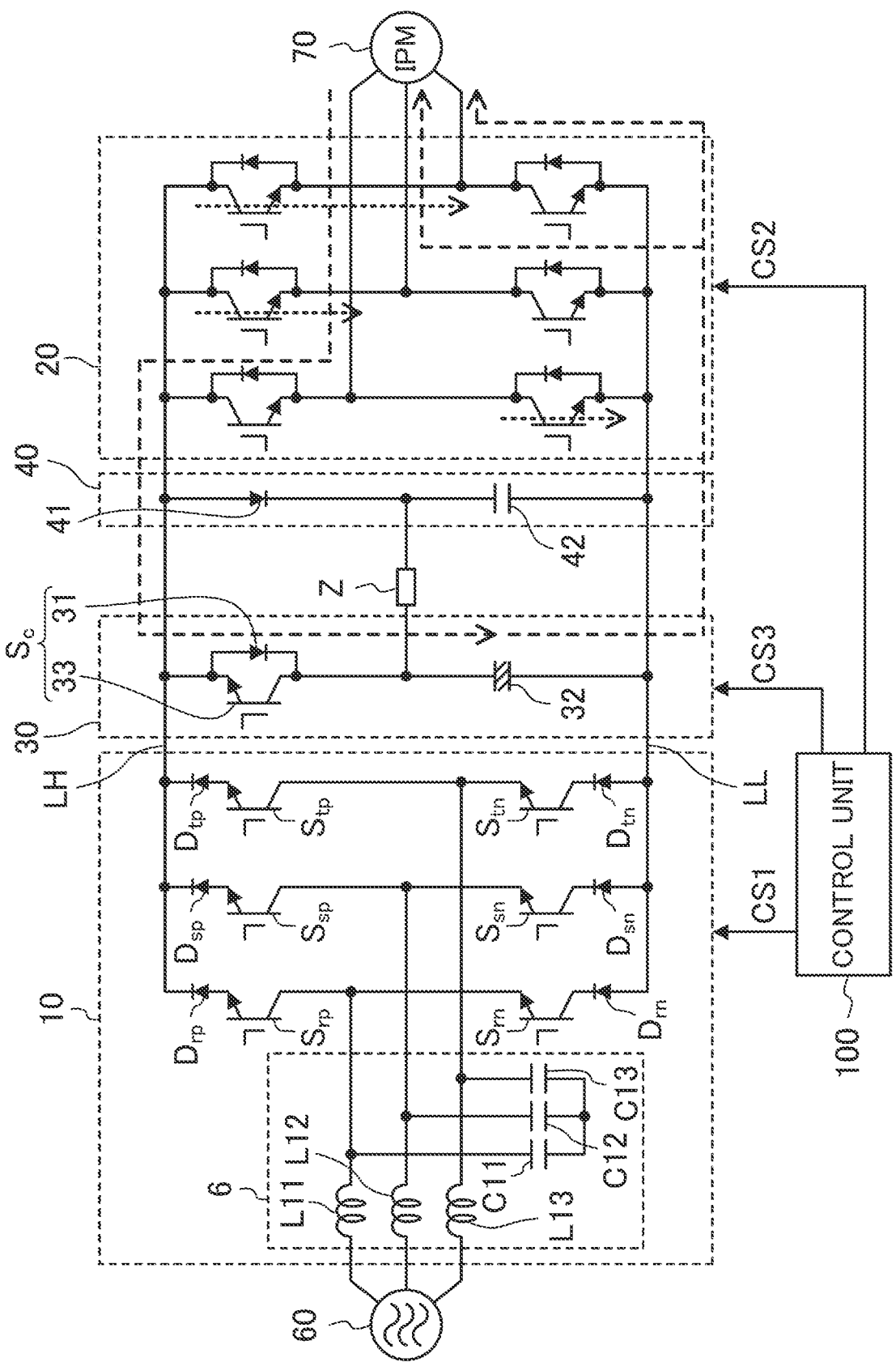
FIG. 7 is a diagram illustrating a flow of a regenerative current from a motor.

The power converter (1) would possibly have such a case that the power is regenerated from the motor (70) to the DC section via the inverter circuit (20). FIG. 7 is a view illustrating a flow of the current when the operation is switched from power-running operation for the motor (70) to the regenerative operation. There are two situations in which the regeneration would occur, namely, a case in which the regeneration occurs within a certain time immediately after the shutting-off of the transistor due to overcurrent protection, and a case in which the regeneration occurs repeatedly in a certain phase during power-running operation with a low load power factor.

For example, assume that the inverter circuit (20) supplies a current to the motor (70), while the phase currents of the inverter circuit (20) are −iu, +iv, +iw. Under this assumption, it is further assumed that the transistors (Sup, Svp, Swp, Sun, Svn, Swn) are turned OFF in order to protect the inverter circuit (20) from overcurrent. Accordingly, a regenerative current occurs in the DC section of the converter circuit (10) through the diodes (Dup, Dvp, Dwp, Dun, Dvn, Dwn). When the regenerative current occurs, the power is accumulated in the first capacitor (32) of the clamp circuit (30). Here, the capacitor capacitance of the clamp circuit (30) is selected so that it does not exceed the voltage rating of the inverter circuit (20) and converter elements, taking into account the motor accumulated energy.

It is known that a regenerative current occurs at a certain phase when the load power factor is low (see, for example, Japanese Patent No. 4049189). In this case, the regenerative current repeatedly occurs in the certain phase of a motor driving current, thereby increasing the voltage of the first capacitor (32) of the clamp circuit (30).

The control unit (100) controls the transistor (33) in such a way that, if the voltage of the first capacitor (32) (the clamp voltage (vdc_c)) is higher than the DC link voltage (vdc), the transistor (33) is turned ON according to the control signal (CS3). When the transistor (33) is turned ON, the converter voltage is shut off, and the power is supplied to the inverter circuit (20) (the motor (70)) with the first capacitor (32) of the clamp circuit (30) serving as a voltage source. Here, with the switching section (Sc) capable of causing the current to flow bidirectionally, the electric charge of the clamp capacitor accumulated with the regenerative current in the certain phase can be discharged in a power-running operation of another phase so as to decrease the clamp voltage (vdc_c).

After the clamp voltage (vdc_c) is approximately near the highest value of the DC link voltage (vdc) due to the discharge of the first capacitor (32), the control unit (100) controls the transistor (33) (switching section (Sc)) by the control signal (CS3), thereby turning OFF the transistor (33) (switching section (Sc)). This stops the power supply from the first capacitor (32) to the inverter circuit (20) (the motor (70)).

Advantages of this Embodiment

The snubber circuit (40) of this embodiment does not have a resistor that stationarily generates a loss. In this embodiment, the clamp circuit (30) holds the peak value of the highest voltage. In the period during which the snubber circuit (40) absorbs the surge power, a value near the peak value is held. This embodiment configured as such can facilitate reduction of the loss in the snubber circuit (40).

In the following, the loss reduction effect according to this embodiment is estimated.

Figure 8:
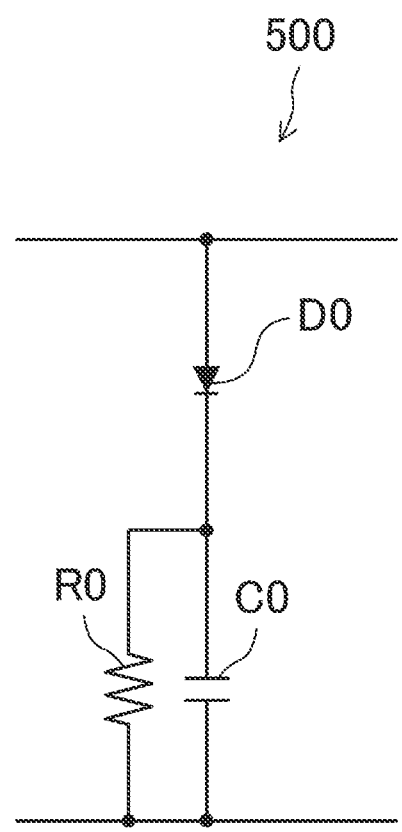
FIG. 8 is an example of a conventional snubber circuit.

Before describing the effect of this embodiment, a conventional snubber circuit will be described first. FIG. 8 is an example of a conventional snubber circuit (RCD snubber circuit (500)). The RCD snubber circuit (500) includes a resistor (R0), a capacitor (C0), and a diode (D0). In the RCD snubber circuit (500), the capacitor (C0) and the resistor (R0) are connected in parallel. The diode (D0) and the capacitor (C0) are connected in series.

Here, assume a configuration in which the snubber circuit (40) of this embodiment is replaced with the RCD snubber circuit (500) (this configuration will be referred to as a conventional example, for the sake of easy explanation). The RCD snubber circuit (500) is such that a time constant of the series circuit of the resistor (R0) and the capacitor (C0) is of order of 10 milliseconds.

Figure 19:
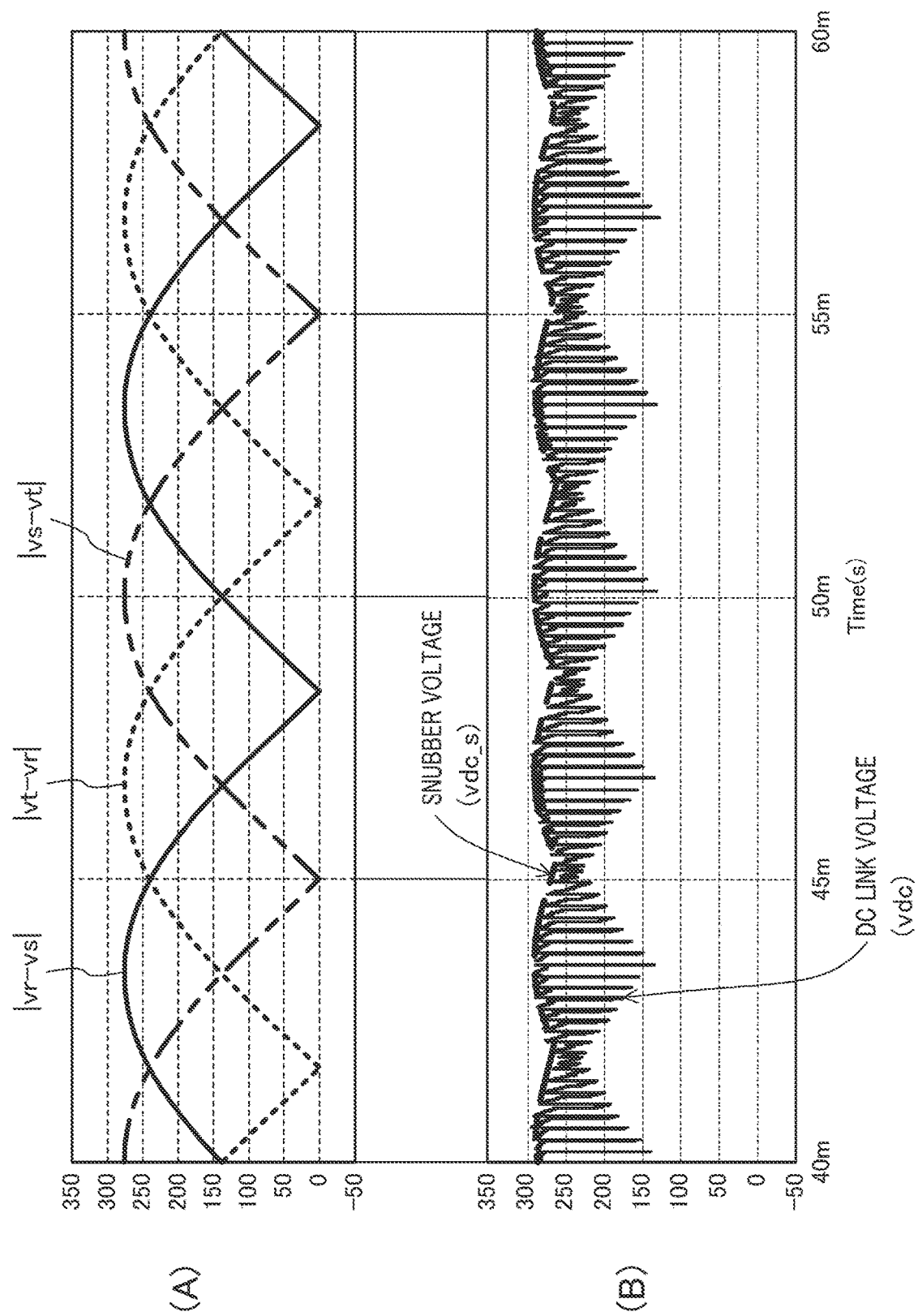
FIG. 19 is a diagram showing examples of waveforms of a snubber voltage and the other waveforms in a conventional example.

In the conventional example, the intermediate voltage at the output of the converter circuit (10) is blocked by the diode (D0). Meanwhile, the RCD snubber circuit (500) continues the discharge of the highest voltage of the converter circuit (10). In other words, the RCD snubber circuit (500) has a loss stationarily occurring in the resistor (R0). In a case where the power supply of the power converter (1) is a three-phase power supply, the highest voltage of the DC link is pulsated with a cycle that is ⅙ of the power supply cycle (for example, if the power supply frequency is 50 Hz or 60 Hz, the cycle of pulsation would be about 3 milliseconds). Therefore, due to the relationship between the snubber time constant and the cycle of pulsation, surge loss occurs in the first ⅔ period of the pulsation (see FIG. 19).

The loss due to the resistor (R0) in the RCD snubber circuit (500) can be expressed as the equation below.

Math 2

$$P_R = (\sqrt{2} V_S)^2 / R \quad (1)$$

In this Equation (1), Vs is the voltage of the AC voltage source (60), and R is the resistance of the resistor (R0). Here, $V_S$=200 V to 230 V, and R=204 kΩ. When the loss due to the resistor (R0) (hereinafter referred to as a stationary loss) is calculated using Equation (1) under this assumption, $P_R$=0.39 W to 0.51 W.

On the other hand, the snubber circuit (40) of this embodiment does not have a component corresponding to the resistor (R0) of the RCD snubber circuit (500). According to this embodiment, a stationary loss occurring in the resistor (R0) will not occur.

In the conventional RCD snubber circuit (500), the power due to the surge generated (which will be referred to as surge power hereinafter) also generates a certain loss (which will be referred to as a surge loss hereinafter).

For example, it is assumed that the snubber voltage (vdc_s) increases by 10 V from the highest voltage of the voltages output from the converter circuit (10). The energy increased by the increase of the snubber voltage (vdc_s) can be represented by the following equation.

Math 3

$$\Delta E_S = \frac{1}{2} C_S \{(\sqrt{2} V_S + 10)^2 - 2V_S^2\} \tag{2}$$

In this equation, Cs is the electrostatic capacitance of the capacitor (C0). Here, if Vs=200 V and Cs=0.068 μF, ΔEs=195.73 μJ.

Here, it is assumed that the inverter circuit (20) is controlled by a so-called three-arm PWM modulation. It is assumed that the transistors (Sup, Svp, Swp, Sun, Svn, Swn) are turned OFF three times, and that the carrier frequency is 5.0 kHz. Under this assumption, the loss Pr due to surge power is calculated as below:

$$Pr=3\times\Delta Es\times 5000=2.94 \text{ W}$$

This means that the RCD snubber circuit (500) requires a 3 W-class resistor as the resistor (R0).

In contrast, according to this embodiment, the clamp circuit (30) accumulates the surge power, and the surge power thus accumulated can be supplied to the motor (70) (load) as power.

Here, for example, it is assumed that the snubber voltage (vdc_s) increases by 10V from the highest voltage of the voltages output from the converter circuit (10). The energy $E_{s1}$ accumulated in the second capacitor (42) of the snubber circuit (40) can be represented by the following equation.

Math 4

$$E_{S1} = \frac{1}{2} C_s (\sqrt{2} V_S + 10)^2 \tag{3}$$

If Vs=200 V and Cs=0.068 μF as in the case of the RCD snubber circuit (500), $E_{s1}$=2.92 mJ.

The energy initially accumulated in the first capacitor (32) of the clamp circuit (30) can be represented by the following equation.

Math 5

$$E_{c1} = \frac{1}{2} C_C (\sqrt{2} V_S)^2 \tag{4}$$

In this equation, Cs is the electrostatic capacitance of the first capacitor (32). If Cc=760 μF, $E_{c1}$=30.4 J.

After discharging from the second capacitor (42) having the initial voltage ($V_{S1}$) to the first capacitor (32) having the initial voltage ($V_{S2}$), the voltage ($V_{C2}$) of the first capacitor (32) and the voltage ($V_{S2}$) of the second capacitor (42) become equal to each other. As a result of this, the total electric charge amount is maintained either in the charging and the discharging, so that the following equation is established.

Math 6

$$V_{S2} = V_{C2} = \frac{C_S V_{S1} + C_S V_{c1}}{C_S + C_C} = 282.84\text{V} \tag{5}$$

The energy ($E_{C2}$) accumulated in the first capacitor (32) and the energy ($E_{S2}$) accumulated in the second capacitor (42) can be represented by the following equation.

Math 7

$$E_{S2} = \frac{1}{2} C_S V_{S2}^2, \tag{6}$$

$$E_{C2} = \frac{1}{2} C_C V_{C2}^2 \tag{7}$$

Thus, the regenerated energy and the regeneration rate in this embodiment are worked out as below.

$$E_{C2} - E_{C1} = 192.32 \text{ μJ}$$

$$(E_{C2} - E_{C1})/\Delta E_S = 98.3\%$$

In addition, the energy ($E_R$) consumed by the resistor is worked out as below.

$$E_R = (E_{S1} + E_{C1}) - (E_{S2} + E_{C2}) = 3.40 \text{ μJ}$$

Under the same conditions as in the RCD snubber circuit (500), the loss and the recovered power in this embodiment are worked out as follows.

$$Pr = 3 \times E_R \times 5000 = 51 \text{ mW}$$

$$Prr = 3 \times (E_{C2} - E_{C1}) \times 5000 = 2.88 \text{ W}$$

As described above, in this embodiment, the load of the inverter circuit (20) is the motor (70). The clamp circuit (30) has a function of absorbing the inductive energy of the motor (70). The snubber circuit (40) has a function of absorbing the surge power of the stray inductance of the DC link. For the regeneration, the surge power is supplied from the snubber circuit (40) to the clamp circuit (30) via the element (Z).

Advantages of this Embodiment

This embodiment configured as such can facilitate reduction of the loss (stationary loss and the surge loss) in the snubber circuit. Furthermore, the snubber circuit of this embodiment is configured with fewer components than the conventional snubber circuit (RCD snubber circuit (500)). This embodiment facilitates mounting measures for wiring inductance reduction for allowing the carrier signal of the inverter circuit (20) to have a higher frequency.

In particular, with this embodiment, in which the frequency defining the inductance is specified, the regenerative operation to the clamp circuit (30) physically separated from the snubber circuit (40) can be performed while avoiding the resonance phenomenon due to the wiring inductance.

In the conventional device, even if the capacitor capacitance is increased so that the RC snubber circuit functions as a clamp circuit, the inductive energy of the load of the DC section mainly flows through the diode of the snubber circuit and the stopper diode. In addition, a sudden current flows in the conventional device. This causes resonances in the conventional device due to the stray inductance and the capacitor of the snubber circuit. It is difficult in the conventional device to place the clamp circuit and the snubber circuit at positions physically separated from each other.

Variations of First Embodiment

Figure 9:
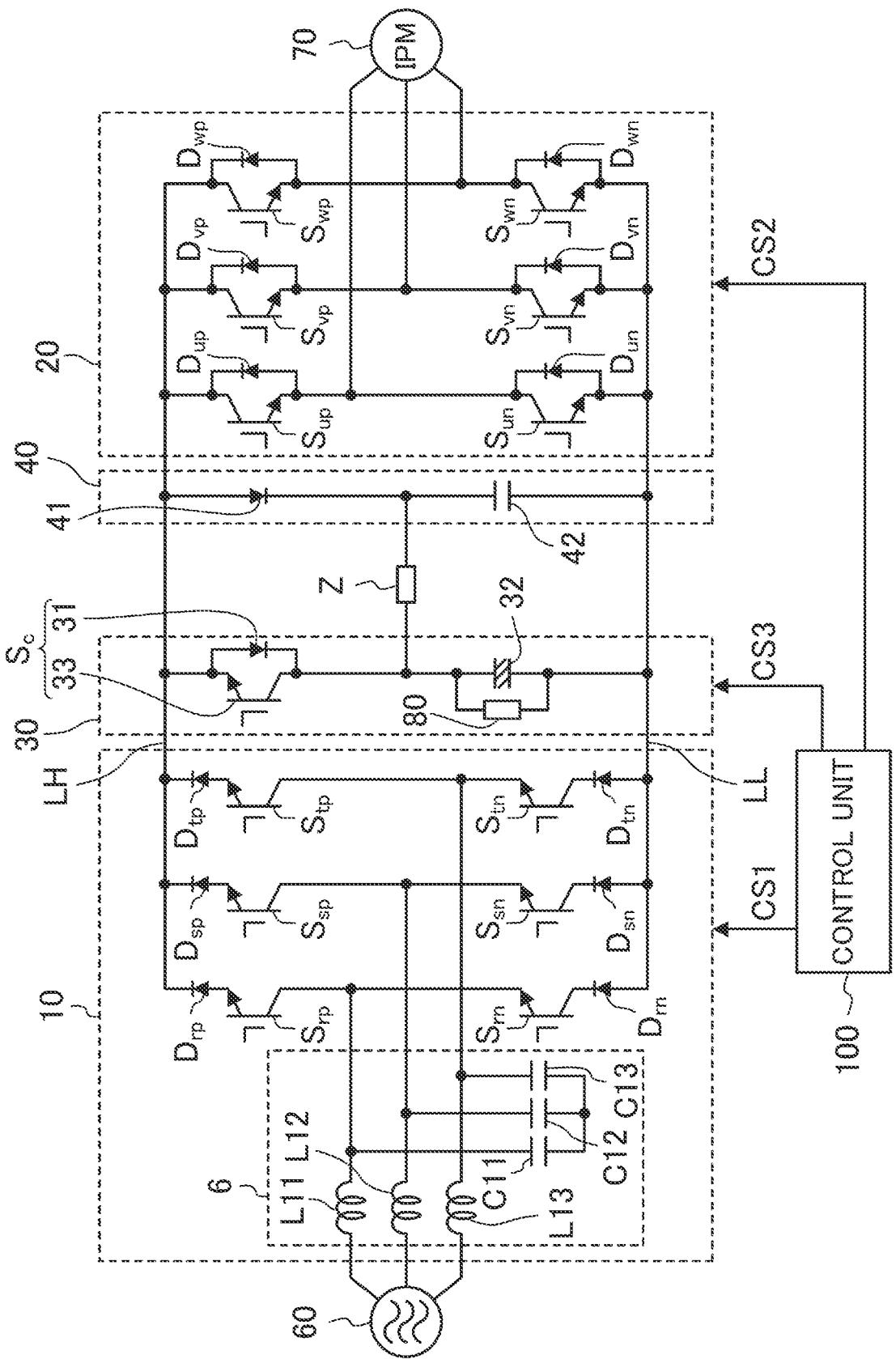
FIG. 9 is a block diagram illustrating a power converter according to a variation of the first embodiment.

FIG. 9 illustrates a variation of the first embodiment. This example is different from the first embodiment in that the first capacitor (32) is connected in parallel with a load (80). The load (80) is a load other than the motor (70). The load (80) may be any load, as long as the load is operable by a DC voltage source. For example, a device that drives a motor (other than the motor (70)) may be connected as a load (80).

Second Embodiment

Figure 10:
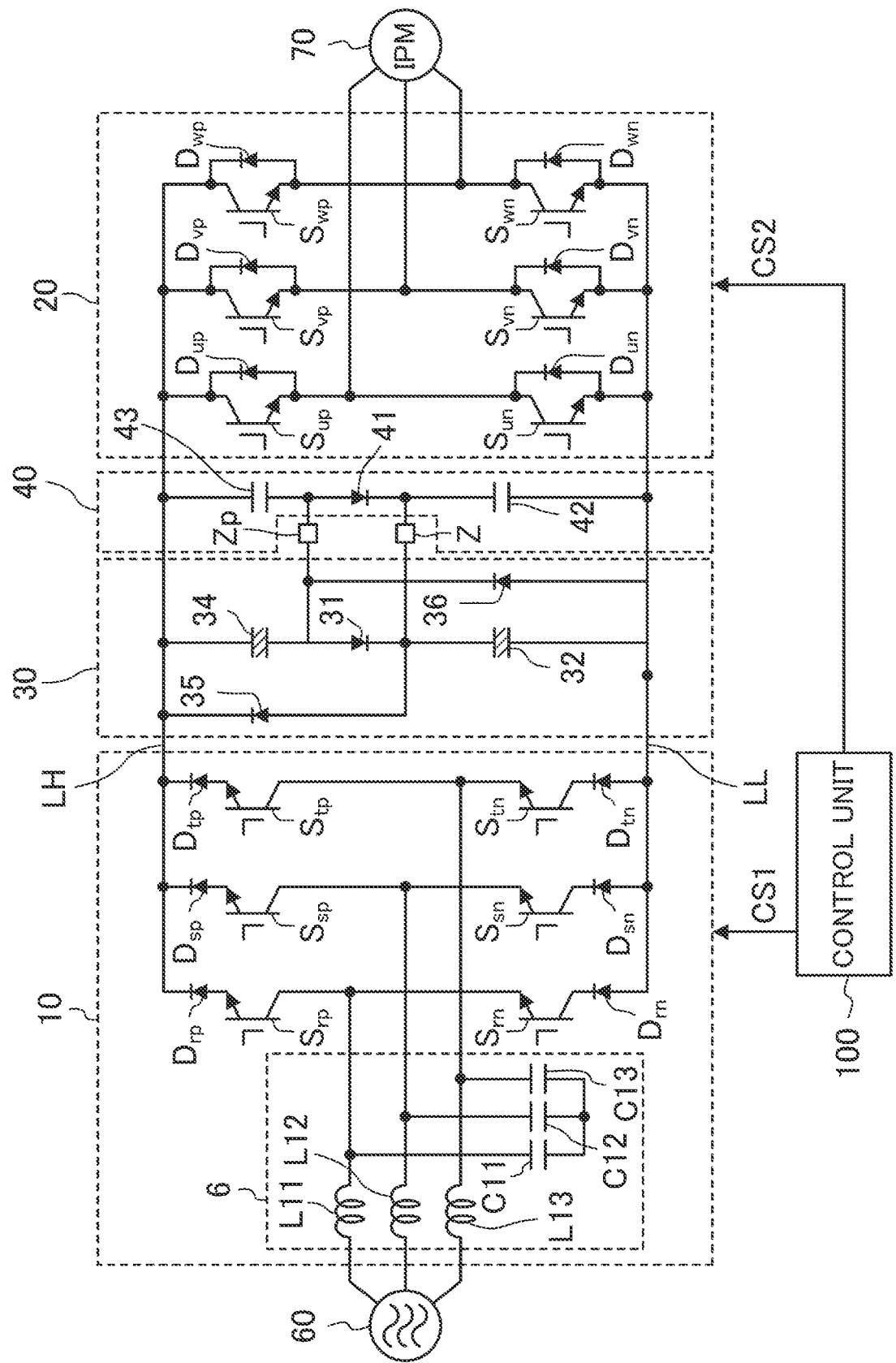
FIG. 10 is a block diagram illustrating a configuration of a power converter according to a second embodiment.

FIG. 10 is a block diagram illustrating a configuration of a power converter (1) according to a second embodiment. The power converter (1) of this embodiment includes a converter circuit (10), an inverter circuit (20), a clamp circuit (30), a snubber circuit (40), an element (Z), an element (Zp), and a control unit (100).

The power converter (1) of this embodiment is the same as the first embodiment as to the configurations of the converter circuit (10) and the inverter circuit (20). The power converter (1) of this embodiment is different from the first embodiment as to the configurations of the clamp circuit (30) and the snubber circuit (40).

The clamp circuit (30) includes a first diode (31), a first capacitor (32), a third capacitor (34), a fourth diode (35), and a fifth diode (36). The third capacitor (34), the first diode (31), and the first capacitor (32) are connected in series in this order between a positive power supply line (LH) and a negative power supply line (LL).

More specifically, one end of the third capacitor (34) is connected with the positive power supply line (LH). The other end of the third capacitor (34) is connected with the anode of the first diode (31). The cathode of the first diode (31) is connected with one end of the first capacitor (32). The other end of the first capacitor (32) is connected with the negative power supply line (LL).

The anode of the fourth diode (35) is connected with the cathode of the first diode (31). The cathode of the fourth diode (35) is connected with the positive power supply line (LH). The cathode of the fifth diode (36) is connected with the anode of the first diode (31). The anode of the fifth diode (36) is connected with the negative power supply line (LL). The clamp circuit (30) is such that the fourth diode (35) and the fifth diode (36) forms a switching section.

The snubber circuit (40) includes a second diode (41), a second capacitor (42), and a fourth capacitor (43). The fourth capacitor (43), the second diode (41), and the second capacitor (42) are connected in series in this order between the positive power supply line (LH) and the negative power supply line (LL).

One end of the fourth capacitor (43) is connected with the positive power supply line (LH). The other end of the fourth capacitor (43) is connected with the anode of the second diode (41). The cathode of the second diode (41) is connected with one end of the second capacitor (42). The other end of the second capacitor (42) is connected with the negative power supply line (LL).

The element (Z) is an element with a resistive component in this embodiment as well. The element (Z) is connected with one end of the first capacitor (32) at which the first capacitor (32) is connected with the first diode (31), and with one end of the second capacitor (42) at which the second capacitor (42) is connected with the second diode (41).

The element (Zp) is also an element with a resistive component. The element (Zp) is connected with one end of the third capacitor (34) at which the third capacitor (34) is connected with the first diode (31), and with one end of the fourth capacitor (43) at which the fourth capacitor (43) is connected with the second diode (41).

The elements (Z) and (Zp) may have various configurations. As in the first embodiment, a resistor or a series circuit of a resistor and a diode can be employed as the element (Z) or the element (Zp).

In this embodiment, too, the impedances from the positive output to the negative output are such that the impedance across the clamp circuit (30) is lower than the impedance across the snubber circuit (40).

In this embodiment, the first and second diodes (31, 41) are connected on the positive side with respect to the first capacitor (32) and the second capacitor (42). In this embodiment, the element (Z) is so configured that, among the impedances from the cathode of the second diode (41) to the negative output, the impedance across the clamp circuit (30) is higher than the impedance across the snubber circuit (40).

In this embodiment, the first and second diodes (31, 41) are connected on the negative side with respect to the third capacitor (34) and the fourth capacitor (43). In this embodiment, the element (Zp) is so configured that, among the impedances from the anode of the second diode (41) to the positive output, the impedance across the clamp circuit (30) is higher than the impedance across the snubber circuit (40).

Operation Example

Operations of the clamp circuit (30) and the snubber circuit (40) will be described herein. For the explanation, it is assumed that the line on the positive side between the clamp circuit (30) and the snubber circuit (40) has a stray inductance.

For example, assume that the current flowing into the inverter circuit (20) is shut off. Consequently, the energy accumulated in the stray inductance (Lp) flows through the path including the fourth capacitor (43), the second diode (41), and the second capacitor (42) in this order as a current.

The current flowing through the fourth capacitor (43) is equal to the current flowing through the second capacitor (42). Therefore, the fourth capacitor (43) and the second capacitor (42) accumulate the electric charges evenly. The voltage of fourth capacitor (43) and the voltage of the second capacitor (42) increase equally.

On the other hand, in both the cases of the highest voltage and the intermediate voltage, the snubber circuit (40) discharges to the clamp circuit (30) through both the path formed by the fourth capacitor (43), the element (Zp) and the third capacitor (34) and the path formed by the second capacitor (42), the element (Z) and the first capacitor (32).

The clamp circuit (30) is charged with the electromagnetic energy of the motor (70) via the inverter circuit (20) through the path including the third capacitor (34), the first capacitor (32), and the first diode (31) in this order. When the DC link voltage (vdc) is the intermediate voltage, the clamp circuit (30) discharges in parallel through the path formed by the first capacitor (32) and the fourth diode (35) and the path formed by the fifth diode (36) and the third capacitor (34). In other words, the fourth diode (35) and the fifth diode (36)

(switching section) switch over between conducting and non-conducting according to the magnitude of the DC link voltage (vdc).

As described above, when the discharging is performed in the clamp circuit (30), the clamp circuit (30) functions as a voltage source for the inverter circuit (20). In other words, the power converter (1) is so configured that the motor (70) is driven with the energy accumulated in the clamp circuit (30).

Advantages of this Embodiment

According to this embodiment, too, the stationary loss and the surge loss can be reduced as in the first embodiment. The clamp circuit (30) of this embodiment does not include an element (for example, a transistor) that needs to be controlled. In other words, this embodiment allows easier control than the first embodiment.

Third Embodiment

Figure 11:
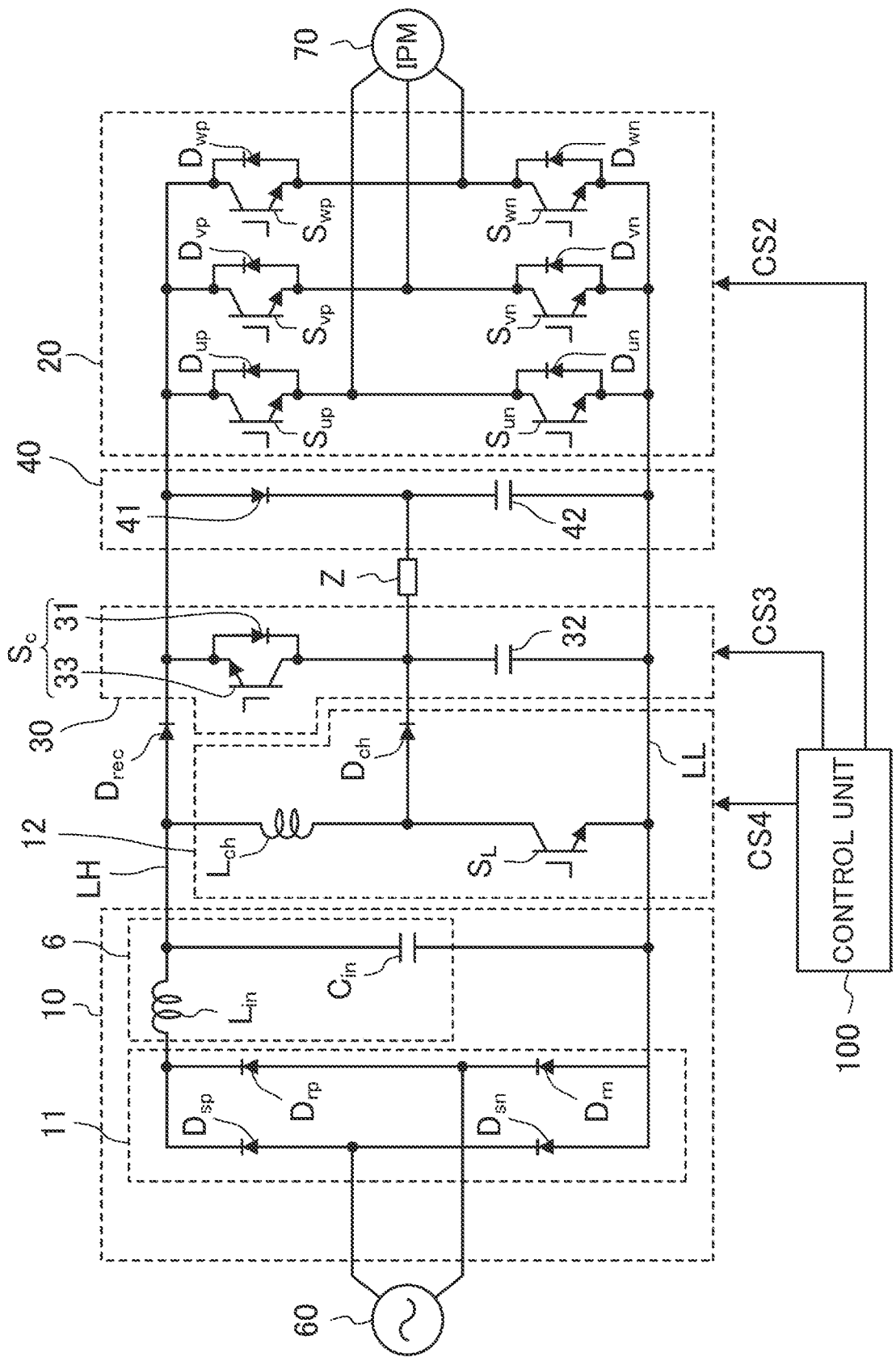
FIG. 11 is a block diagram illustrating a configuration of a power converter according to a third embodiment.

FIG. 11 is a block diagram illustrating a configuration of a power converter (1) according to a third embodiment. The power converter (1) includes a converter circuit (10), an inverter circuit (20), a clamp circuit (30), a snubber circuit (40), a boost chopper circuit (12), a diode (Drec), an element (Z), and a control unit (100).

The power converter (1) of this embodiment is identical with the first embodiment as to the configurations of the inverter circuit (20), the clamp circuit (30), and the snubber circuit (40). This embodiment is different from the first embodiment as to the configuration of the converter circuit (10). This embodiment is different from the first embodiment as to the function of the control unit (100), partially. The AC voltage source (60) is a single-phase AC voltage source.

The converter circuit (10) is configured to generate, from an AC voltage source (60), a DC voltage with AC components superimposed. The converter circuit (10) includes a rectifier circuit (11) and a filter circuit (6).

The rectifier circuit (11) includes four diodes (Drp, Dsp, Drn, Dsn). The four diodes (Drp, Dsp, Drn, Dsn) form a bridge circuit. The rectifier circuit (11) performs full-wave rectification of a single-phase power supply voltage (power supply voltage (vin)) input from the AC voltage source (60). The rectifier circuit (11) outputs, across the positive power supply line (LH) and the negative power supply line (LL), a DC voltage obtained by the full-wave rectification (hereinafter, this voltage will be referred to as a rectified voltage).

The converter circuit (10) is connected with the diode (Drec). The diode (Drec) is provided on the positive power supply line (LH). The forward direction of the diode (Drec) is directed from the rectifier circuit (11) toward the inverter circuit (20). The diode (Drec) has a function of blocking a current flowing from the first capacitor (32) to the capacitor (Cin). The positional relationship between the diode (Drec) and the other circuits (elements) will be described later.

The filter circuit (6) includes a coil (Lin) and a capacitor (Cin). The coil (Lin) is provided on the positive power supply line (LH) between the rectifier circuit (11) and the clamp circuit (30).

More specifically, one end of the coil (Lin) is connected with the positive output of the rectifier circuit (11). The other end of the coil (Lin) is connected with the anode of the diode (Drec) and one end of the capacitor (Cin) on the positive power supply line (LH). The other end of the capacitor (Cin) is connected with the negative power supply line (LL) between the rectifier circuit (11) and the clamp circuit (30).

The capacitor (Cin) is configured as, for example, a film capacitor. The capacitor (Cin) has an electrostatic capacitance smaller than the electrostatic capacitance of an electrolytic capacitor. The capacitor (Cin) hardly smooths the rectified voltage output from the rectifier circuit (11). The voltage across the capacitor (Cin) pulsates with the same periodicity as the pulsation of the rectified voltage.

The boost chopper circuit (12) includes a coil (Lch), a diode (Dch), a transistor (SL) (switching element). One end of the coil (Lch) is connected with the positive power supply line (LH) between the coil (Lin) and the diode (Drec). The other end of the coil (Lch) is connected with the collector of the transistor (SL).

The emitter of the transistor (SL) is connected with the negative power supply line (LL) between the other end of the capacitor (Cin) and the other end of the first capacitor (32). The transistor (SL) is turned ON and OFF according to a control signal (CS4) supplied from the control unit (100) (the control will be described later).

The anode of the diode (Dch) is connected with the collector of the transistor (SL). The cathode of the diode (Dch) is connected between the first capacitor (32) and the transistor (33).

Operation Example

Figure 12:
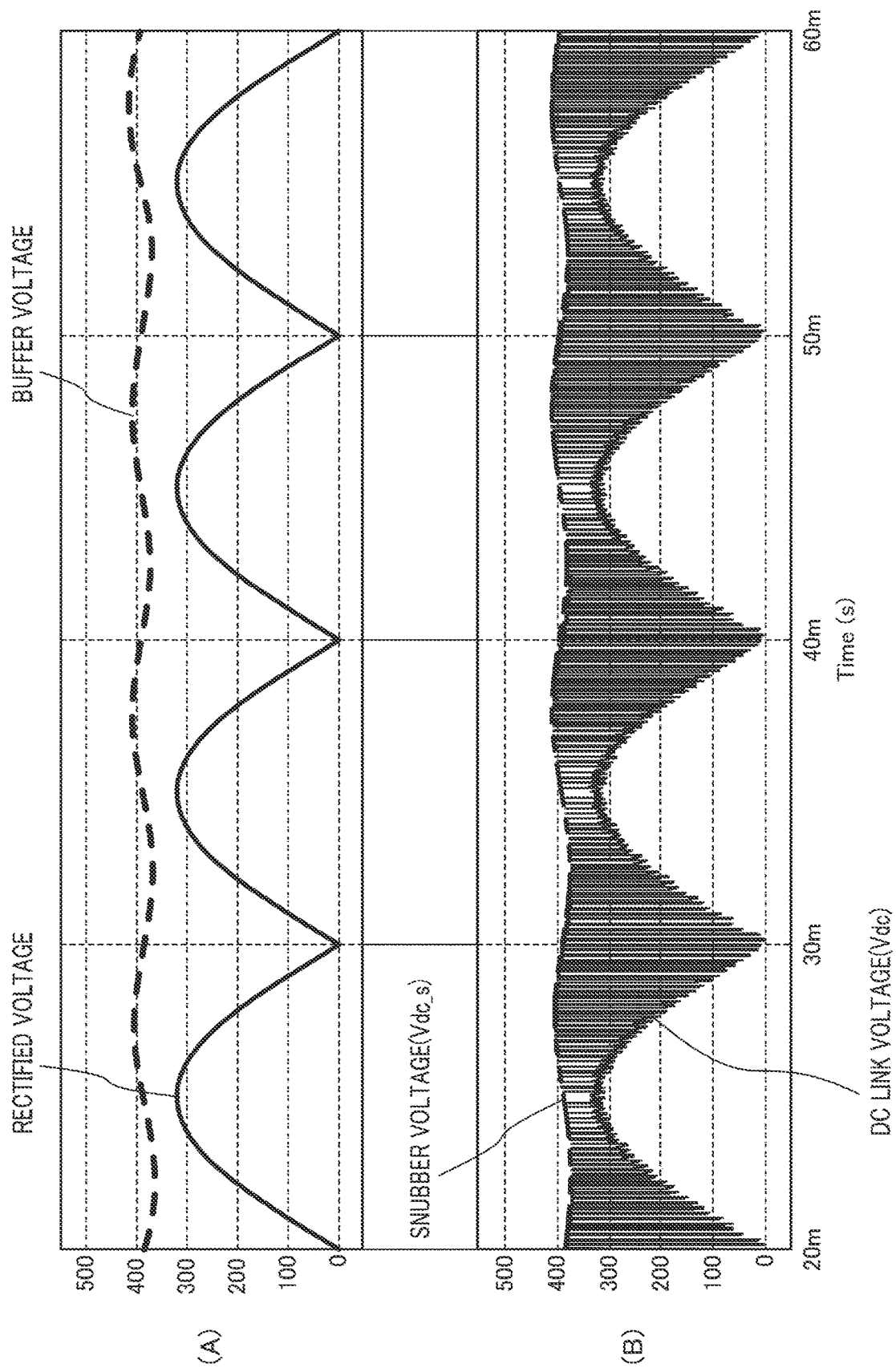
FIG. 12 is a diagram showing examples of a waveform of a rectified voltage and the other waveforms in the third embodiment.

The converter circuit (10) is configured to convert the single-phase AC voltage from the AC voltage source (60) to a DC voltage. FIG. 12 is a view illustrating examples of a waveform of a rectified voltage and the other waveforms in the third embodiment. In FIG. 12, (A) illustrates the exemplary waveform of the rectified voltage and an exemplary waveform of a buffer voltage (described later). In FIG. 12, (B) illustrates an exemplary waveform of the DC link voltage (vdc) and an exemplary waveform of a snubber voltage (vdc_s).

In this embodiment, the control unit (100) controls the boost chopper circuit (12), the clamp circuit (30), and the inverter circuit (20). As to the control of the boost chopper circuit (12) and the clamp circuit (30), known control techniques may be references (for example, Japanese Patent No. 5804167).

The transistor (SL) of the boost chopper circuit (12) is turned ON and OFF according to a control signal (CS4) supplied from the control unit (100). The transistor (33) of the clamp circuit (30) is turned ON and OFF according to a control signal (CS3) supplied from the control unit (100).

More specifically, the control unit (100) performs control (third control) for sequentially realizing energy accumulation in the coil (Lch) and energy accumulation in the first capacitor (32). The control unit (100) also performs control (fourth control) for discharging the first capacitor (32).

In the third control, the control unit (100) turns ON the transistor (SL) at a predetermined conduction ratio. For example, if the control unit (100) turns ON the transistor (SL), the boost chopper circuit (12) outputs the current from the positive power supply line (LH) to the negative power supply line (LL) via the coil (Lch) and the transistor (SL). Accordingly, the energy is accumulated in the coil (Lch). In other words, the boost chopper circuit (12) accumulates the energy in the coil (Lch) with the DC voltage.

In the third control, the control unit (100) turns OFF the transistor (SL) after the energy is accumulated in the coil (Lch). This causes the energy accumulated in the coil (Lch) to be transferred and accumulated in the first capacitor (32) via the diode (Dch).

By the third control, a voltage higher than the voltage (rectified voltage) between the terminals of the capacitor (Cin) is generated between the terminals of the first capacitor (32). The voltage between the terminals of the first capacitor (32) (the voltage obtained by boosting) is hereafter referred to as the buffer voltage.

In the fourth control, the control unit (100) turns ON the transistor (33) only for a predetermined time. This causes the first capacitor (32) to discharge to the positive power supply line (LH).

Unlike «Fourth Embodiment» described later, the third control and the fourth control are asynchronously performed due to the diode (Drec). By the fourth control, in this embodiment, the DC link voltage (vdc) is generated with either the rectified voltage or the buffer voltage (see (B) of FIG. 12). The DC link voltage (vdc) is supplied to the inverter circuit (20).

The snubber circuit (40) operates similarly to the snubber circuit (40) of the first embodiment. In this embodiment, too, the snubber circuit (40) functions near the highest voltage of the DC link voltage (vdc). More specifically, the snubber circuit (40) temporarily accumulates the surge power in the second capacitor (42). The snubber circuit (40) discharges the energy (power) accumulated in the second capacitor (42) to the first capacitor (32) via the element (Z).

The inverter circuit (20) performs the PWM modulation on both the rectified voltage and the buffer voltage and outputs to the motor (70) an AC voltage thus modulated. The PWM modulation is controlled by the control unit (100). For performing the control, the control unit (100) outputs to the control terminals of the transistors (Sup, Svp, Swp, Sun, Svn, Swn) the control signal (CS2) for controlling the ON/OFF of the transistors (Sup, Svp, Swp, Sun, Svn, Swn).

Advantages of this Embodiment

Here, for example, assume a configuration in which the snubber circuit (40) of this embodiment is replaced with the conventional RCD snubber circuit (500) (this configuration will be referred to as a conventional example, for the sake of easy explanation). In the conventional example, the DC link voltage (vdc) is generated with either the rectified voltage or the buffer voltage. In the RCD snubber circuit (500), the stationary loss and the surge loss occur stationarily.

In contrast, according to this embodiment, the clamp circuit (30) also functions as a buffer circuit. Therefore, the snubber voltage is not fixed to the power supply peak value. Thus, the surge power is absorbed from the snubber circuit (40) to the clamp circuit (30) throughout the whole periods, whereby the power is regenerated to the load. In other words, this embodiment can also facilitate the reduction of the surge loss caused due to the operation of the snubber circuit. This embodiment can also reduce the stationary loss that occurs in the conventional snubber circuit.

Fourth Embodiment

Figure 13:
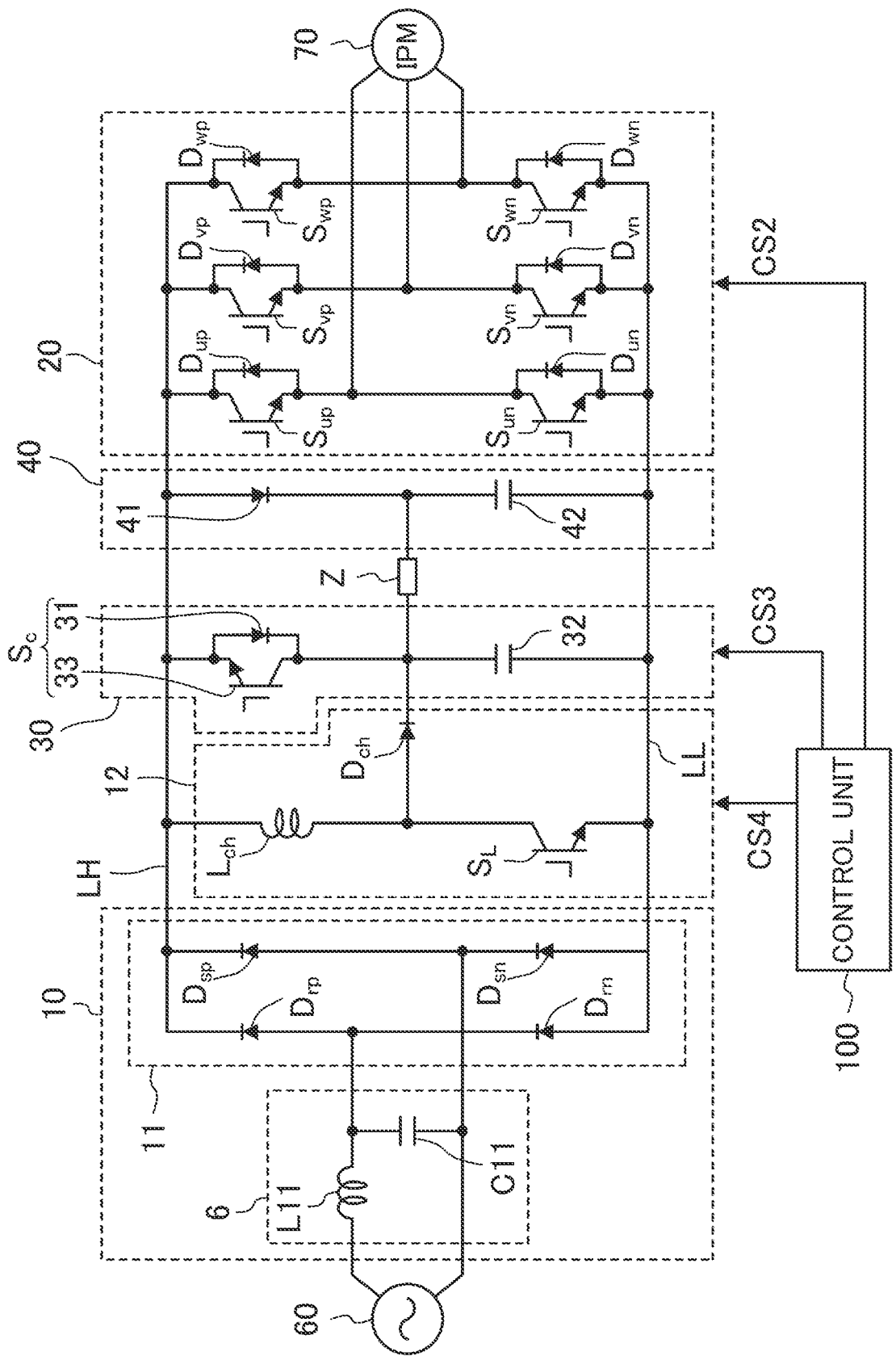
FIG. 13 is a block diagram illustrating a configuration of a power converter according to a fourth embodiment.

FIG. 13 is a block diagram illustrating a configuration of a power converter (1) according to a fourth embodiment. The power converter (1) includes a converter circuit (10), an inverter circuit (20), a clamp circuit (30), a snubber circuit (40), a boost chopper circuit (12), an element (Z), and a control unit (100). In this embodiment, too, the AC voltage source (60) is a single-phase AC voltage source.

In this embodiment, too, the converter circuit (10) is configured to generate, from the AC voltage source (60), a DC voltage with AC components superimposed. The converter circuit (10) of this embodiment is different from that of the third embodiment as to the configuration of the filter circuit (6). The filter circuit (6) of this embodiment includes a coil (L11) and a capacitor (C11).

One end of the coil (L11) is connected with an output of the AC voltage source (60). The other end of the coil (L11) is connected with an anode of a diode (Drp). The other end of the coil (L11) is connected with one end of the capacitor (C11). The other end of the capacitor (C11) is connected with another output of the AC voltage source (60) (which is the output thereof not connected with the coil (L11)).

Operation Example

Figure 14:
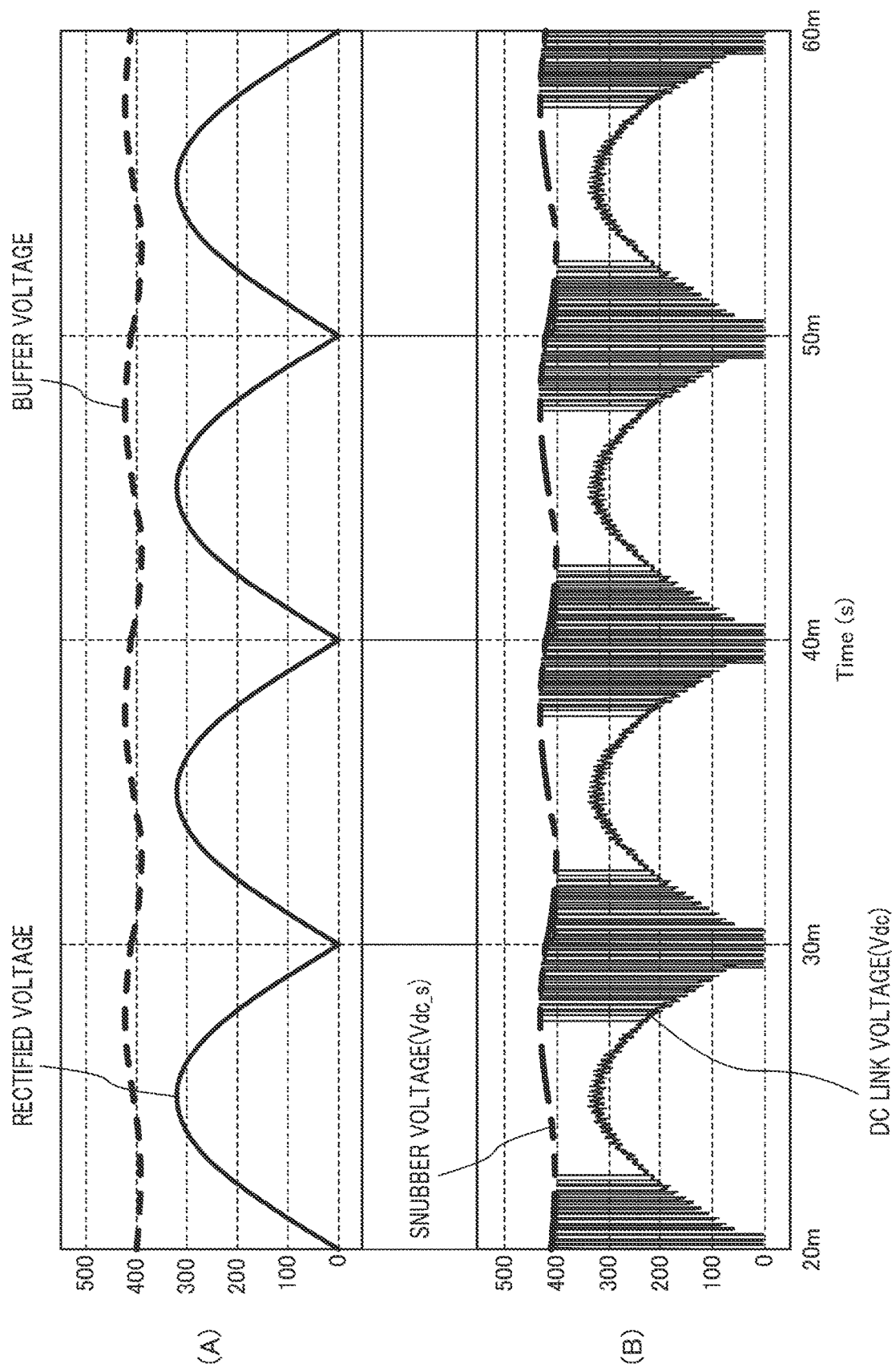
FIG. 14 is a diagram showing examples of a waveform of a rectified voltage and the other waveforms in the fourth embodiment.

The converter circuit (10) is configured to convert the single-phase AC voltage from the AC voltage source (60) to a DC voltage. FIG. 14 is a view illustrating examples of waveforms of a rectified voltage, and the other waveforms in the fourth embodiment. In FIG. 14, (A) illustrates an exemplary waveform of the rectified voltage and an exemplary waveform of a buffer voltage. In FIG. 14, (B) illustrates an exemplary waveform of the DC link voltage (vdc) and an exemplary waveform of a snubber voltage (vdc_s).

In this embodiment, too, the control unit (100) controls the boost chopper circuit (12), the clamp circuit (30), and the inverter circuit (20). As to the control of the boost chopper circuit (12) and the clamp circuit (30), known control techniques may be references (for example, Japanese Patent No. 5629885).

The control unit (100) turns ON and OFF the transistor (SL) of the boost chopper circuit (12) by the control signal (CS4). The control unit (100) turns ON and OFF the transistor (33) of the clamp circuit (30) by the control signal (CS3).

In this embodiment, too, the control unit (100) controls the boost chopper circuit (12) and the inverter circuit (20) to have a supplying period and a receiving period. The supplying period is a period in which the phase angle ωt of a single-phase AC voltage of the AC voltage source (60) is not less than 0 but not more than π/4, not less than 3π/4 but not more than 5π/4, or not less than 7π/4 but not more than 2π. The receiving period is a period other than the supplying period.

In the receiving period, the control unit (100) performs a series of controls (third control) for the energy accumulation in the coil (Lch) and the energy accumulation in the first capacitor (32).

In the receiving period, the control unit (100) turns ON the transistor (SL) at a predetermined conduction ratio, and turns OFF the transistor (33). Consequently, the boost chopper circuit (12) outputs the current from the positive power supply line (LH) to the negative power supply line (LL) via the coil (Lch) and the transistor (SL). Accordingly, the energy is accumulated in the coil (Lch).

In the third control, the control unit (100) turns OFF the transistor (SL) and the transistor (33) after the energy is accumulated in the coil (Lch). This causes the energy accumulated in the coil (Lch) to be transferred and accumulated in the first capacitor (32) via the diode (Dch). By the third control, a voltage higher than the voltage (rectified voltage) between the terminals of the capacitor (Cin) is generated between the terminals of the first capacitor (32).

In the supplying period, the control unit (100) performs a series of controls (fourth control) for the discharging of the first capacitor (32). In the fourth control, the control unit (100) turns ON the transistor (33) only for a predetermined period. This causes the first capacitor (32) to discharge to the positive power supply line (LH).

By performing the third control and the fourth control sequentially, the rectified voltage and the buffer voltage are generated as the DC link voltage (vdc) sequentially (see (B) in FIG. 14) in this embodiment. The DC link voltage (vdc) is supplied to the inverter circuit (20).

The snubber circuit (40) functions similarly to the snubber circuit (40) of the first embodiment. In this embodiment, too, the snubber circuit (40) functions near the highest voltage of the DC link voltage (vdc). More specifically, the snubber circuit (40) temporarily accumulates the surge power in the second capacitor (42). The snubber circuit (40) discharges the energy (power) accumulated in the second capacitor (42) to the first capacitor (32) via the element (Z).

The inverter circuit (20) performs the PWM modulation on both the rectified voltage and the buffer voltage and outputs to the motor (70) an AC voltage thus modulated. In this embodiment, too, the PWM modulation is controlled by the control unit (100).

Advantages of this Embodiment

Here, for example, assume a configuration in which the snubber circuit (40) of this embodiment is replaced with the conventional RCD snubber circuit (500) (this configuration will be referred to as a conventional example, for the sake of easy explanation). In the conventional example, either the rectified voltage or the buffer voltage is selected. Along this operation, the stationary loss and the surge loss occur in the RCD snubber circuit (500) stationarily.

In the case of this conventional example, the receiving period is such that the DC link voltage is the rectified voltage during the quarter period of the power supply, thereby decreasing the clamp voltage greatly, and an inrush current to the snubber circuit in switching from the power supply voltage to the buffer voltage in the supplying period becomes large. As a result, in the conventional example, the capacitance of the second diode increases.

In contrast, according to this embodiment, the clamp circuit (30) also functions as a buffer circuit, thereby maintaining the peak value of the highest voltage. In the period during which the snubber circuit (40) absorbs the surge power, a value near the peak value is held. This embodiment configured as such can facilitate reduction of the loss in the snubber circuit (40). Furthermore, in this embodiment, it is possible to avoid an inrush current to the snubber circuit (40) in switching from the power supply voltage to the buffer voltage. As a result, the capacitance of the second diode (41) in the snubber circuit (40) can be reduced.

Fifth Embodiment

Figure 15:
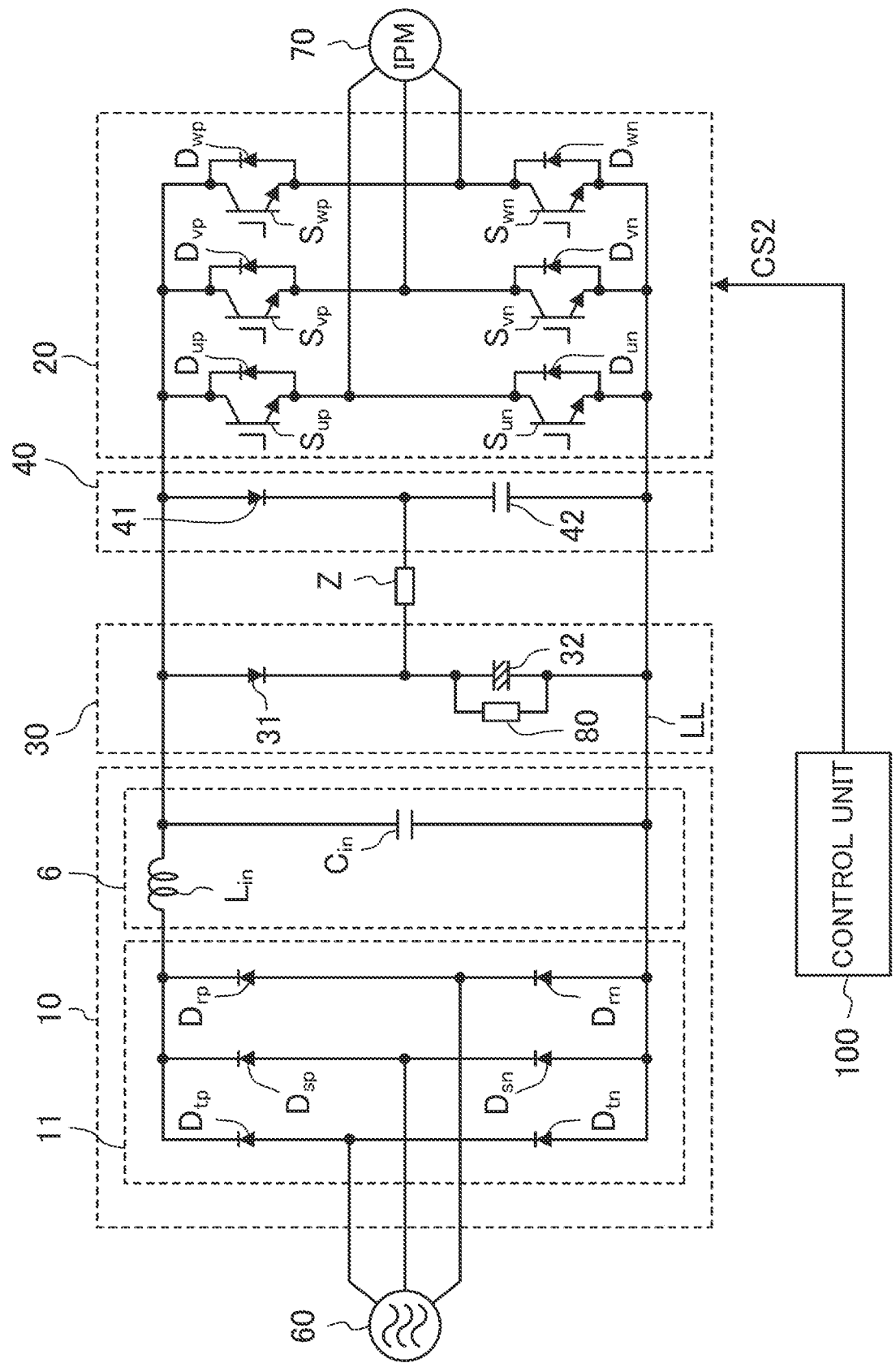
FIG. 15 is a block diagram illustrating a configuration of a power converter according to a fifth embodiment.

FIG. 15 is a block diagram illustrating a configuration of a power converter (1) according to a fifth embodiment. The power converter (1) of this embodiment includes a converter circuit (10), an inverter circuit (20), a clamp circuit (30), a snubber circuit (40), an element (Z), and a control unit (100). In this embodiment, the AC voltage source (60) is a three-phase AC voltage source.

The power converter (1) of this embodiment is such that the first capacitor (32) of the clamp circuit (30) is connected in parallel with a load (80).

The power converter (1) of this embodiment is different from the first embodiment as to the configurations of the converter circuit (10). The converter circuit (10) is configured to generate, from an AC voltage source (60), a DC voltage with AC components superimposed. The converter circuit (10) includes a rectifier circuit (11) and a filter circuit (6).

The rectifier circuit (11) includes six diodes (Drp, Dsp, Dtp, Drn, Dsn, Dtn). The six diodes (Drp, Dsp, Dtp, Drn, Dsn, Dtn) form a bridge circuit. The rectifier circuit (11) performs full-wave rectification of a three-phase power supply voltage (yin) supplied from the AC voltage source (60). The rectifier circuit (11) outputs, across the positive power supply line (LH) and the negative power supply line (LL), a DC voltage (rectified voltage) obtained by the full-wave rectification.

The filter circuit (6) includes a coil (Lin) and a capacitor (Cin). The coil (Lin) is provided on the positive power supply line (LH) between the rectifier circuit (11) and the clamp circuit (30).

One end of the coil (Lin) is connected, on the positive power supply line (LH), with the positive output of the rectifier circuit (11). The other end of the coil is connected, on the positive power supply line (LH), with the anode of the first diode (31) and one end of the capacitor (Cin). The other end of the capacitor (Cin) is connected with the negative power supply line (LL) between the rectifier circuit (11) and the clamp circuit (30).

Figure 16:
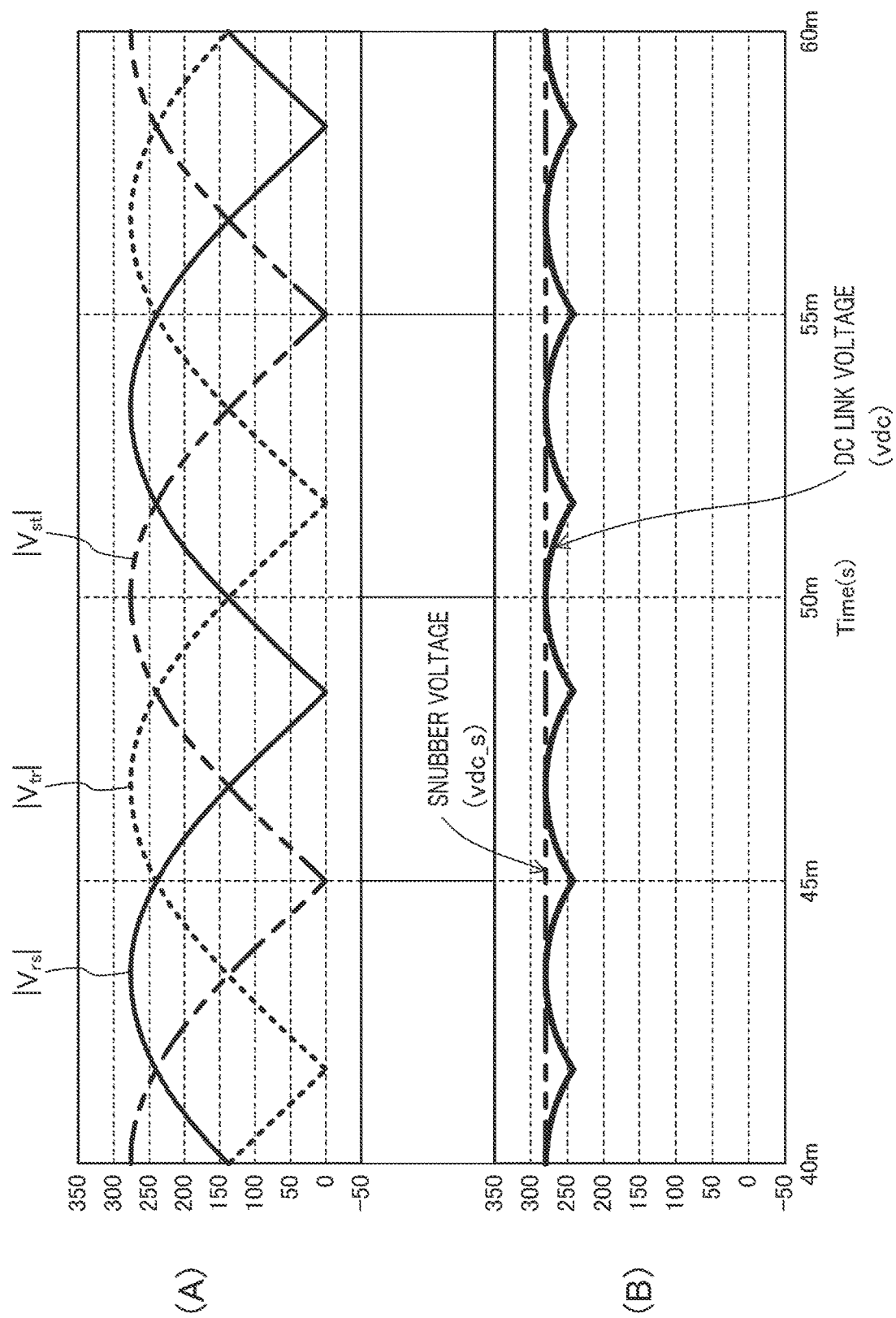
FIG. 16 is a diagram showing examples of waveforms of absolute values of line voltages of an AC voltage source, and the other waveforms.

For attaining the waveform of FIG. 16, the capacitor (Cin) is configured as, for example, a film capacitor. The capacitor (Cin) has an electrostatic capacitance smaller than the electrostatic capacitance of an electrolytic capacitor. The capacitor (Cin) hardly smooths the rectified voltage output from the rectifier circuit (11). The voltage across the capacitor (Cin) pulsates with the same periodicity as the pulsation of the rectified voltage.

Operation Example

FIG. 16 is a view illustrating examples of waveforms of absolute values of line voltages of an AC voltage source (60), and the other waveforms. In FIG. 16, (A) illustrates exemplary waveforms of absolute values of a three-phase line voltage. In FIG. 16, (B) illustrates an exemplary waveform of the DC link voltage (vdc) and an exemplary waveform of the snubber voltage (vdc_s).

The converter circuit (10) is configured to convert the three-phase AC voltage from the AC voltage source (60) to a DC voltage. More specifically, the rectifier circuit (11) selectively outputs a highest voltage among the absolute values of the line voltages (see (A) of FIG. 16).

The clamp circuit (30) of this embodiment operates similarly to the clamp circuit (30) of the first embodiment. As a result, the clamp circuit (30) maintains the peak value of the DC link voltage (vdc).

The snubber circuit (40) also functions similarly to the snubber circuit (40) of the first embodiment. In this embodiment, too, the snubber circuit (40) functions near the highest voltage of the DC link voltage (vdc). More specifically, the snubber circuit (40) temporarily accumulates the surge power in the second capacitor (42). The snubber circuit (40) discharges the energy (power) accumulated in the second capacitor (42) to the first capacitor (32) via the element (Z). Through the series of operations of the snubber circuit (40), the snubber voltage (vdc_s) becomes as illustrated in (B) of FIG. 16.

The inverter circuit (20) performs the PWM modulation on the DC link voltage (vdc) and outputs to the motor (70) an AC voltage thus modulated. In this embodiment, too, the PWM modulation is controlled by the control unit (100).

Advantages of this Embodiment

Here, for example, assume a configuration in which the snubber circuit (40) of this embodiment is replaced with the conventional RCD snubber circuit (500) (this configuration will be referred to as a conventional example, for the sake of easy explanation). Consequently, as described in the first embodiment, certain stationary loss and surge loss occur in the conventional example. In the case of the conventional example, the highest value of the DC link voltage is pulsated with a frequency 6-times more frequent than that of the power supply. In this conventional example, the surge loss occurs almost continuously.

In contrast, according to this embodiment, the clamp circuit (30) maintains the peak value of the DC link voltage (vdc). Therefore, in the period in which the snubber circuit (40) absorbs the surge power, a value near the highest value of the DC link voltage (vdc) is held. This embodiment configured as such can facilitate reduction of the loss accompanied with the regeneration. This embodiment can facilitate reduction of the surge loss associated with the operation of the snubber circuit (40). This embodiment can also reduce the stationary loss that would occur in the conventional snubber circuit.

In this embodiment, the load (80) is connected to the first capacitor (32). This allows the load (80) to effectively utilize the energy accumulated in the first capacitor (32).

Sixth Embodiment

Figure 17:
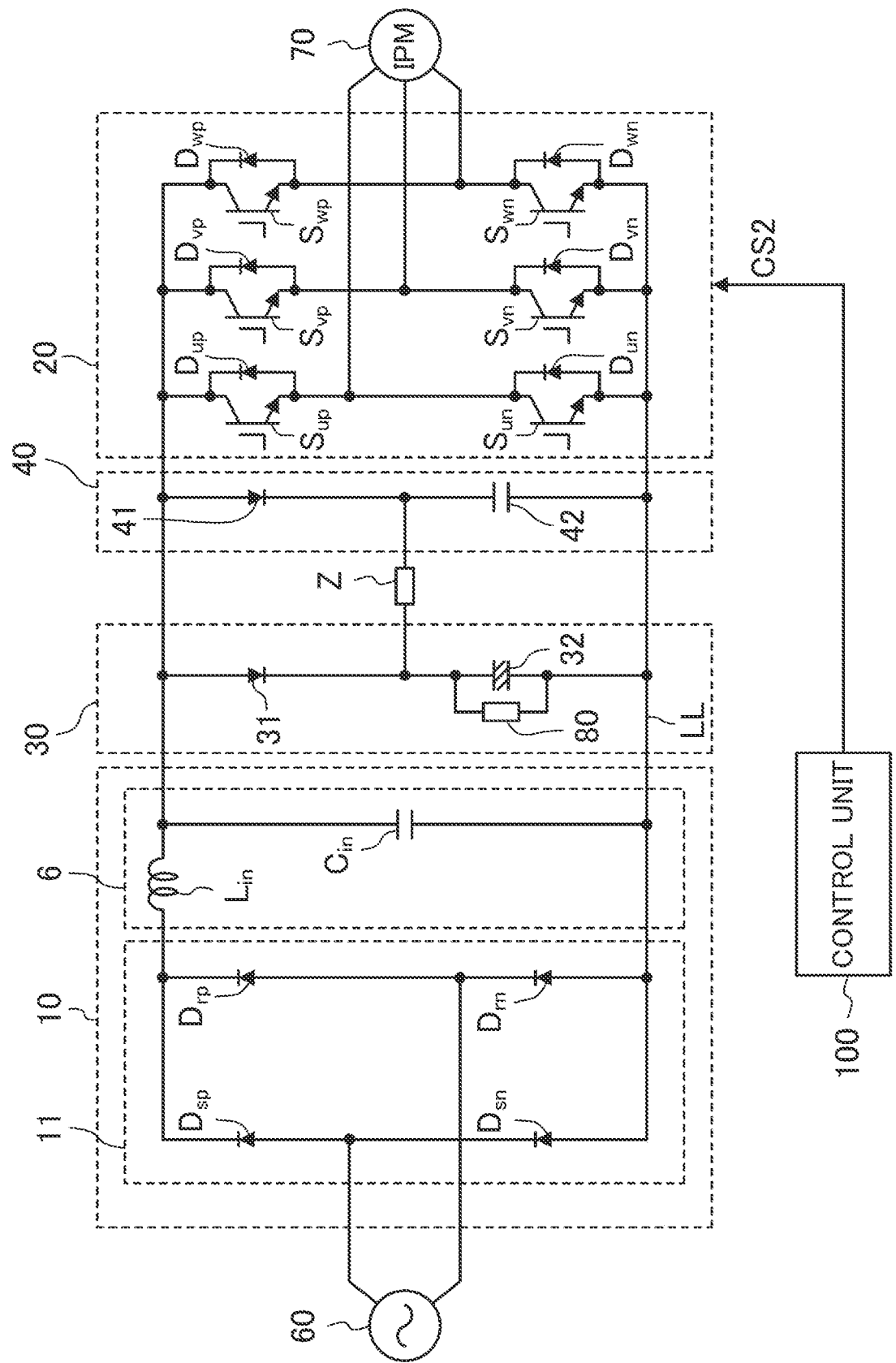
FIG. 17 is a block diagram illustrating a configuration of a power converter according to a sixth embodiment.

FIG. 17 is a block diagram illustrating a configuration of a power converter (1) according to a sixth embodiment. The power converter (1) of this embodiment includes a converter circuit (10), an inverter circuit (20), a clamp circuit (30), a snubber circuit (40), an element (Z), and a control unit (100). In this embodiment, the AC voltage source (60) is a single-phase AC voltage source.

The power converter (1) is such that the first capacitor (32) of the clamp circuit (30) is connected in parallel with the load (80).

The power converter (1) of this embodiment is different from the first embodiment as to the configurations of the converter circuit (10). The converter circuit (10) of this embodiment includes a rectifier circuit (11) and a filter circuit (6).

The rectifier circuit (11) includes four diodes (Drp, Dsp, Drn, Dsn). The four diodes (Drp, Dsp, Drn, Dsn) form a bridge circuit. The rectifier circuit (11) performs full-wave rectification on the single-phase power supply voltage (yin) supplied from the AC voltage source (60). The rectifier circuit (11) outputs, across the positive power supply line (LH) and the negative power supply line (LL), a DC voltage (rectified voltage) obtained by the full-wave rectification.

The filter circuit (6) includes a coil (Lin) and a capacitor (Cin). The coil (Lin) is provided on the positive power supply line (LH) between the rectifier circuit (11) and the clamp circuit (30).

One end of the coil (Lin) is connected with the positive output of the rectifier circuit (11). The other end of the coil is connected, on the positive power supply line (LH), with the anode of the first diode (31) and one end of the capacitor (Cin). The other end of the capacitor (Cin) is connected with the negative power supply line (LL) between the rectifier circuit (11) and the clamp circuit (30).

Figure 18:
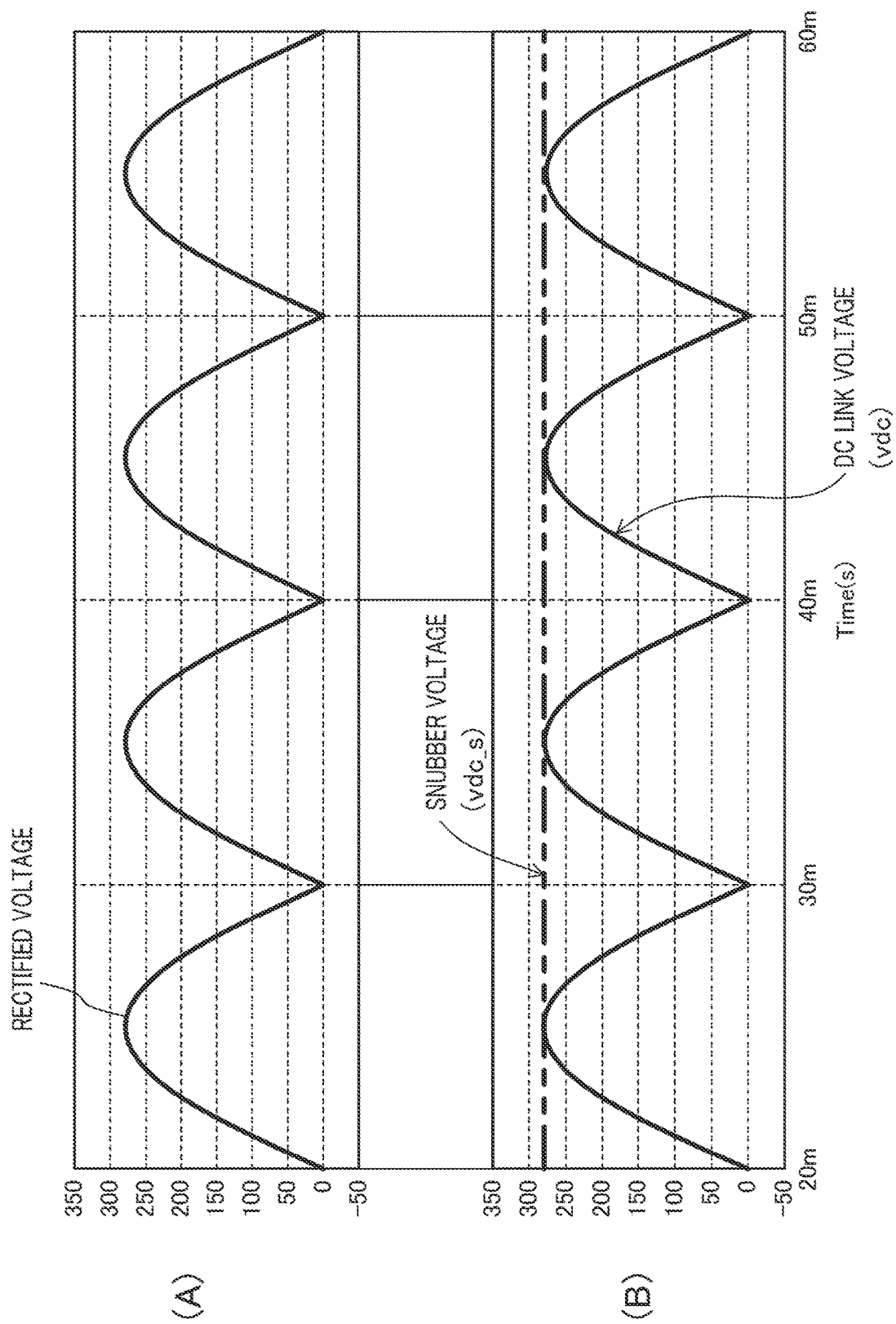
FIG. 18 is a diagram showing examples of a waveform of a rectified voltage and the other waveforms in the sixth embodiment.

With the waveform of FIG. 18, the capacitor (Cin) is configured as, for example, a film capacitor. The capacitor (Cin) has an electrostatic capacitance smaller than the electrostatic capacitance of an electrolytic capacitor. The capacitor (Cin) hardly smooths the rectified voltage output from the rectifier circuit (11). The voltage across the capacitor (Cin) pulsates with the same periodicity as the pulsation of the rectified voltage.

Operation Example

FIG. 18 is a view illustrating examples of a waveform of a rectified voltage, and the other waveforms in the sixth embodiment. In FIG. 18, (A) illustrates an exemplary waveform of the rectified voltage. In FIG. 18, (B) illustrates an exemplary waveform of the DC link voltage (vdc) and an exemplary waveform of the snubber voltage (vdc_s).

The converter circuit (10) is configured to convert the single-phase AC voltage from the AC voltage source (60) to a DC voltage. In this embodiment, in which the electrostatic capacitance of the capacitor (Cin) is small, the voltage across the capacitor (Cin) (DC link voltage (vdc)) pulsates with the same periodicity as the pulsation of the rectified voltage (see (B) of FIG. 18).

The clamp circuit (30) of this embodiment operates similarly to the clamp circuit (30) of the first embodiment. As a result, the clamp circuit (30) maintains the peak value of the DC link voltage (vdc).

The snubber circuit (40) also functions similarly to the snubber circuit (40) of the first embodiment. In this embodiment, too, the snubber circuit (40) functions near the highest voltage of the DC link voltage (vdc). More specifically, the snubber circuit (40) temporarily accumulates the surge power in the second capacitor (42). The snubber circuit (40) discharges the energy (power) accumulated in the second capacitor (42) to the first capacitor (32) via the element (Z). Through the series of operations of the snubber circuit (40), the snubber voltage (vdc_s) becomes as illustrated in (B) of FIG. 18.

Advantages of this Embodiment

Here, for example, assume a configuration in which the snubber circuit (40) of this embodiment is replaced with the conventional RCD snubber circuit (500) (this configuration will be referred to as a conventional example, for the sake of easy explanation). Consequently, as described in the first embodiment, a certain loss occur in the conventional example. In the case of this conventional example, the driving is performed only with the power supply voltage. In this conventional example, the power supply cycle and the time constant of the RCD snubber circuit (500) are substantially equal to each other, thereby resulting in a large snubber voltage drop, which leads to a surge loss absorbing period as short as ½ of the power supply cycle.

In contrast, according to this embodiment, the clamp circuit (30) maintains the peak value of the DC link voltage (vdc). Therefore, in the period in which the snubber circuit (40) absorbs the surge power, a value near the highest value of the DC link voltage (vdc) is held. This embodiment can facilitate reduction of the surge loss associated with the operation of the snubber circuit (40). This embodiment can also reduce the stationary loss that would occur in the conventional snubber circuit.

Other Embodiments

The embodiments and variations may also be configured as follows.

The transistors employed in the circuits may be various switching elements. For examples, the transistors in the circuits may be a so-called insulated gate bipolar transistor (IGBT), or a unipolar transistor, whose main material is silicon carbide (SiC) or gallium nitride (GaN).

The diodes (such as the first diode (31)) connected in antiparallel respectively with a transistor (switching element) may be a body diode, which the transistor has.

The configurations of the elements (Z) and (Zp) are not limited to the examples described above. For example, the element (Z) or (Zp) may be configured as a combination of elements having a resistive component.

The AC voltage source (60) may be a more-than-three phase AC voltage source.

The clamp circuit (30) may include a first capacitor (32) and a first diode (31) so as to be capable of performing rectification and smoothing. More specifically, the first diode (31) is configured to have a diode current rating sufficient for the load connected thereto (in other words, a diode current rating greater than the element capacitance required for the inductive load). Moreover, the first capacitor (32) is configured to have a capacitor capacitance sufficient for the smoothing. This configuration makes the clamp circuit (30) connectable to a relatively large load.

The clamp circuit (30) may be so configured that at least one of one end of a first diode (31) or one end of a first capacitor (32) is connected in series with a resistor. This enables a reduction in the inrush current. In other words, it is not necessary to employ an element having a large current capacity as the first diode (31).

While the embodiments and variations thereof have been described above, it will be understood that various changes in form and details may be made without departing from the spirit and scope of the claims. The embodiments and the variations thereof may be modified by combining or replacing their elements as long as intended functions of the subject matter of the present disclosure are not inhibited.

The present disclosure is usefully applicable to a power converter.

The invention claimed is:
1. A power converter, comprising:
a converter circuit configured to generate from an AC voltage source a DC voltage with AC components superimposed;
an inverter circuit having an input connected with an output of the converter circuit, the inverter circuit being configured to
convert the DC voltage into an AC voltage by switching, and
output the AC voltage to an inductive load;
a clamp circuit including a first capacitor and a first diode connected in series, the clamp circuit being connected between a positive output and a negative output of the converter circuit;
a snubber circuit including a second capacitor and a second diode connected in series, the snubber circuit being connected between the positive output and the negative output of the converter circuit; and
an element including a resistive component,
a first output of the converter circuit, a second output of the clamp circuit, a third output of the snubber circuit, and the input of the inverter circuit being arranged in order,
the first and second diodes being connected on a positive side or a negative side with respect to the first and second capacitors,
the element being configured such that
the element connects between
a terminal of the first capacitor, the first diode being connected to the terminal of the first capacitor, and
a terminal of the second capacitor, the second diode being connected to the terminal of the second capacitor,
a first impedance from the positive output to the negative output being such that a second impedance across the clamp circuit is lower than a third impedance across the snubber circuit,
if the first and second diodes are connected on the positive side with respect to the first and second capacitors, a fourth impedance from a cathode of the second diode to the negative output are such that the second impedance across the clamp circuit is higher than the third impedance across the snubber circuit, and
if the first and second diodes are connected on the negative side with respect to the first and second capacitors, a fifth impedance from an anode of the second diode to the positive output are such that the second impedance across the clamp circuit is higher than the third impedance across the snubber circuit.

2. The power converter of claim 1, wherein
the first impedance from the positive output to the negative output is such that the second impedance across the clamp circuit and the third impedance across the snubber circuit are impedances at either one of
a first resonance frequency between a load inductance of the inverter circuit and the first capacitor, or
a second resonance frequency between the first capacitor and an inductance from the AC voltage source to the clamp circuit,
the third impedance across the snubber circuit and the second impedance across the clamp circuit among the fourth impedance from the cathode of the second diode to the negative output if the first and second diodes are connected on the positive side with respect to the first and second capacitors, and
the third impedance across the snubber circuit and the second impedance across the clamp circuit among the fourth impedance from the anode of the second diode to the positive output if the first and second diodes are connected on the negative side with respect to the first and second capacitors, are impedances at either one of
a third resonance frequency between the second capacitor and the inductance from the converter circuit to the snubber circuit, or
a fourth resonance frequency between the second capacitor and the inductance from the snubber circuit to the inverter circuit.

3. The power converter of claim 1, wherein
the element including the resistive component is a resistor.

4. The power converter of claim 1, wherein
the element including the resistive component is a series circuit of a resistor and a third diode.

5. The power converter of claim 1, wherein
the clamp circuit includes a switching section, and the switching section is turned ON when a voltage across the first capacitor is higher than the DC voltage generated by the converter circuit so as to supply power to the load with the first capacitor serving as a voltage source, and turned OFF when the voltage across the first capacitor is lower than the DC voltage generated by the converter circuit.

6. The power converter of claim 1, further comprising:
a control unit configured to control the converter circuit and the inverter circuit,
the AC voltage source being configured to output a multi-phase AC voltage,
the converter circuit including a switching element configured to switch over phases of the multi-phase AC voltage,
the control unit being configured to cause the converter circuit to output two voltages by outputting a first control signal to the converter circuit so as to switch over between a first control and a second control,
 the first control switching the phases such that a phase with a lowest phase voltage is passed while the other phases are switched at a predetermined conduction ratio, and
 the second control switching the phases such that a phase with a highest phase voltage is passed while the other phases are switched at the predetermined conduction ratio,
the control unit being configured to output a second control signal to the inverter circuit, the second control signal causing the inverter circuit to perform PWM modulation on each of the two voltages.

7. The power converter of claim 1, further comprising:
a boost chopper circuit configured to accumulate energy in a coil with the DC voltage;
a control unit configured to control the boost chopper circuit and the clamp circuit,
the AC voltage source being configured to output a single-phase AC voltage,
the converter circuit being configured to rectify the single-phase AC voltage to output the DC voltage,
the control unit being configured to sequentially perform a third control charging the first capacitor with the energy and a fourth control discharging the first capacitor, so that the control unit sequentially selects the DC voltage and a voltage boosted to be higher than the DC voltage and supplies the voltage thus selected to the inverter circuit, and
the control unit being configured to output a second control signal to the inverter circuit, the second control signal causing the inverter circuit to perform PWM modulation on each voltage supplied to the inverter circuit.

8. The power converter of claim 1, wherein
the AC voltage source is configured to output a multi-phase AC voltage, and
the converter circuit includes
 a rectifier circuit configured to rectify a three-phase AC voltage, and
 a capacitor connected between a positive output and a negative output of the rectifier circuit.

9. The power converter of claim 1, wherein
the AC voltage source is configured to output a single-phase AC voltage,
the converter circuit includes
 a rectifier circuit configured to rectify a single-phase AC voltage, and
 a capacitor connected between a positive output and a negative output of the rectifier circuit.

10. The power converter of claim 1, wherein
the first capacitor is connected in parallel with another load.

11. The power converter of claim 10, wherein
the clamp circuit is configured to be capable of performing rectification and smoothing with the first capacitor and the first diode.

12. The power converter of claim 1, wherein
the clamp circuit includes a resistor connected in series with at least one of one end of the first diode or one end of the first capacitor.

13. A power converter, comprising:
a converter circuit configured to generate from an AC voltage source a DC voltage with AC components superimposed;
an inverter circuit having an input connected with an output of the converter circuit, the inverter circuit being configured to
 convert the DC voltage into an AC voltage by switching, and
 output the AC voltage to an inductive load;
a clamp circuit including a first capacitor and a first diode connected in series, the clamp circuit being connected between a positive output and a negative output of the converter circuit;
a snubber circuit including a second capacitor and a second diode connected in series, the snubber circuit being connected between the positive output and the negative output of the converter circuit; and
an element including a resistive component,
a first output of the converter circuit, a second output of the clamp circuit, a third output of the snubber circuit, and the input of the inverter circuit being arranged in order,
the load being a motor,
the clamp circuit absorbing inductive energy of the motor,
the snubber circuit absorbing surge power of a stray inductance of a DC link, and
the surge power being utilized for regeneration by being supplied from the snubber circuit to the clamp circuit via the element.

* * * * *